US006277485B1

(12) United States Patent
Invie et al.

(10) Patent No.: US 6,277,485 B1
(45) Date of Patent: Aug. 21, 2001

(54) ANTISOILING COATINGS FOR ANTIREFLECTIVE SURFACES AND METHODS OF PREPARATION

(75) Inventors: Judith M. Invie, St. Paul; Mark J. Pellerite, Woodbury, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/014,341

(22) Filed: Jan. 27, 1998

(51) Int. Cl.$^7$ ................................................. B32B 27/30
(52) U.S. Cl. ............. 428/336; 106/287.13; 106/287.14; 106/287.16; 427/165; 427/166; 427/167; 427/296; 427/387; 427/389.7; 427/393.4; 427/407.2; 427/419.2; 427/419.5; 427/428; 428/412; 428/421; 428/432; 428/447; 428/451; 428/699; 428/701; 428/702
(58) Field of Search .................................. 427/165, 166, 427/167, 296, 387, 389.7, 393.4, 407.2, 419.2, 419.5, 428; 428/336, 412, 421, 432, 447, 451, 699, 701, 702; 106/287.13, 287.14, 287.16

(56) References Cited

U.S. PATENT DOCUMENTS

| | | | |
|---|---|---|---|
| 3,442,664 | 5/1969 | Heine | 106/2 |
| 3,810,874 | 5/1974 | Mitsch et al. | 528/70 |
| 3,859,320 | 1/1975 | Atherton | 556/422 |

(List continued on next page.)

FOREIGN PATENT DOCUMENTS

| | | |
|---|---|---|
| 1324539 | 11/1993 | (CA) . |
| 166 363 A2 | 1/1986 | (EP) . |
| 282188 | 9/1988 | (EP) . |
| 327 906 A1 | 8/1989 | (EP) . |
| 352 180 A1 | 1/1990 | (EP) . |
| 492 545 A2 | 7/1992 | (EP) . |
| 545 201 A2 | 6/1993 | (EP) . |
| 564 134 A2 | 10/1993 | (EP) . |
| 692 463 A1 | 1/1996 | (EP) . |
| 0 738 771 | 10/1996 | (EP) . |
| 745 568 A1 | 12/1996 | (EP) . |
| 749 021 A2 | 12/1996 | (EP) . |
| 0 797 111 | 9/1997 | (EP) . |
| 2 306 126 | 4/1997 | (GB) . |
| 63-296002 | 12/1963 | (JP) . |
| 64-86101 | 3/1964 | (JP) . |
| 58-126502 | 7/1983 | (JP) . |
| 58-172244 | 10/1983 | (JP) . |
| 58-213653 | 12/1983 | (JP) . |
| 59-026944 | 2/1984 | (JP) . |
| 59-115840 | 7/1984 | (JP) . |
| 61-018901 | 1/1986 | (JP) . |
| 61-040845 | 2/1986 | (JP) . |
| 61-247743 | 11/1986 | (JP) . |
| 63-021601 | 1/1988 | (JP) . |
| 63-288101 | 9/1988 | (JP) . |
| 2-019801 | 1/1990 | (JP) . |
| 2-116543 | 5/1990 | (JP) . |
| 3-266801 | 11/1991 | (JP) . |
| 5-196802 | 8/1993 | (JP) . |
| 5-254073 | 10/1993 | (JP) . |
| 5-341103 | 12/1993 | (JP) . |
| 6-011602 | 1/1994 | (JP) . |
| 6-025599 | 2/1994 | (JP) . |
| 6-082603 | 3/1994 | (JP) . |
| 6-082605 | 3/1994 | (JP) . |
| 6-103928 | 4/1994 | (JP) . |
| 6-279061 | 10/1994 | (JP) . |
| 6-324214 | 11/1994 | (JP) . |
| 7-081978 | 3/1995 | (JP) . |
| 7-287101 | 10/1995 | (JP) . |
| 7-300346 | 11/1995 | (JP) . |
| 7-315882 | 12/1995 | (JP) . |
| 9-127307 | 5/1997 | (JP) . |
| 9-133802 | 5/1997 | (JP) . |
| 9-326240 | 12/1997 | (JP) . |
| 10-026701 | 1/1998 | (JP) . |
| WO 95/23804 | 9/1995 | (WO) . |
| WO 96/31343 | 10/1996 | (WO) . |

OTHER PUBLICATIONS

Kondo et al., "Antireflective films and display devices", Chem Abs. 227:72776w, p. 52 (1997).
"Mechanical Properties of Sputtered Films", brochure of CERAC, Inc., Milwaukee, WI, 3 pages, vol. 2, Jul.–Sep. 1992.
W.J. Smith, *Modern Optical Engineering: The Design of Optical Systems*, 2nd Ed.; McGraw–Hill, Inc.: New York; pp. 125–128 (1990).
I.M. Thomas et al., "A novel perfluorinated AR and protective coating for KDP and other optical materials", *Proc. SPIE–Int. Soc. Opt. Eng.*, 294–303 (1991).
A. Ulman, "Monolayers of Organosilicon Derivatives" in *An Introduction to Ultrathin Organic Films: from Langmuir- -Blodgett to Self–Assembly*; Academic Press: Boston; pp. 245–253 (1991).
S.R. Wasserman et al., "Structure and Reactivity of Alkyl-siloxane Monolayers Formed by Reaction of Alkyltrichlo-rosilanes on Silicon Substrates", *Langmuir*, 5, 1074–1087 (1989).

*Primary Examiner*—D. S. Nakarani
(74) *Attorney, Agent, or Firm*—Stephen W. Buckingham; Mueting, Raasch & Gebhardt, P.A.

(57) ABSTRACT

An antisoiling coating for an antireflective surface, particularly the outer surface of an antireflective film stack, wherein the antisoiling coating includes a fluorinated siloxane, preferably prepared by applying a coating composition of a fluorinated silane, having a number average molecular weight of at least about 1000, of the following formula:

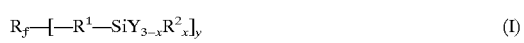

wherein: $R_f$ is a monovalent or divalent polyfluoropolyether group; $R^1$ is a divalent alkylene group, arylene group, or combinations thereof, $R^2$ is a lower alkyl group; Y is a halide, a lower alkoxy group, or a lower acyloxy group; x is 0 or 1; and y is 1 or 2.

43 Claims, No Drawings

U.S. PATENT DOCUMENTS

| | | | |
|---|---|---|---|
| 3,950,588 | 4/1976 | McDougal | 442/80 |
| 4,046,457 | 9/1977 | Land et al. | 359/586 |
| 4,125,673 | 11/1978 | Roth et al. | 428/447 |
| 4,539,061 | 9/1985 | Sagiv | 156/278 |
| 4,687,707 | 8/1987 | Matsuo et al. | 428/336 |
| 4,786,544 | 11/1988 | Saito | 428/143 |
| 4,849,305 | 7/1989 | Yanagisawa | 428/695 |
| 4,902,585 | 2/1990 | Ogawa et al. | 428/694 |
| 4,904,525 | 2/1990 | Taniguchi et al. | 428/328 |
| 4,970,099 | 11/1990 | Adams et al. | 428/76 |
| 4,981,727 | 1/1991 | Briunduse et al. | 427/385.5 |
| 4,983,459 | 1/1991 | Franz et al. | 428/410 |
| 4,990,418 | 2/1991 | Mukoh et al. | 430/56 |
| 4,997,684 | 3/1991 | Franz et al. | 427/384 |
| 5,071,709 | 12/1991 | Berquier et al. | 428/447 |
| 5,081,192 * | 1/1992 | Tatemoto | 525/288 |
| 5,091,244 | 2/1992 | Biornard | 428/216 |
| 5,105,310 | 4/1992 | Dickey | 359/586 |
| 5,139,879 | 8/1992 | Aharoni et al. | 428/422 |
| 5,147,125 | 9/1992 | Austin | 359/359 |
| 5,150,004 | 9/1992 | Tong et al. | 313/479 |
| 5,153,481 | 10/1992 | Matsuda et al. | 313/479 |
| 5,194,326 | 3/1993 | Arthur et al. | 428/325 |
| 5,248,915 | 9/1993 | Tong et al. | 313/478 |
| 5,248,916 | 9/1993 | Tong et al. | 313/478 |
| 5,262,557 | 11/1993 | Kishita et al. | 556/448 |
| 5,270,858 | 12/1993 | Dickey | 359/586 |
| 5,274,159 | 12/1993 | Pellerite et al. | 556/485 |
| 5,281,893 | 1/1994 | Matsuda et al. | 313/478 |
| 5,284,707 | 2/1994 | Ogawa et al. | 428/333 |
| 5,288,889 | 2/1994 | Takago et al. | 556/419 |
| 5,306,758 | 4/1994 | Pellerite | 524/366 |
| 5,324,566 | 6/1994 | Ogawa et al. | 428/141 |
| 5,328,768 | 7/1994 | Goodwin | 428/428 |
| 5,338,877 | 8/1994 | Sawada et al. | 556/440 |
| 5,368,892 | 11/1994 | Berquier | 427/299 |
| 5,372,874 | 12/1994 | Dickey et al. | 428/216 |
| 5,382,639 | 1/1995 | Moore et al. | 526/243 |
| 5,407,709 | 4/1995 | Ogawa et al. | 427/539 |
| 5,407,733 | 4/1995 | Bjornard et al. | 428/216 |
| 5,437,894 | 8/1995 | Ogawa et al. | 427/535 |
| 5,446,205 | 8/1995 | Marchionni et al. | 568/603 |
| 5,450,238 | 9/1995 | Bjornard et al. | 359/580 |
| 5,579,162 | 11/1996 | Bjornard et al. | 359/580 |
| 5,580,819 | 12/1996 | Li et al. | 427/167 |
| 5,622,784 | 4/1997 | Okaue et al. | 428/447 |
| 5,688,864 | 11/1997 | Goodwin | 524/858 |
| 5,744,227 | 4/1998 | Bright et al. | 428/216 |

* cited by examiner

ANTISOILING COATINGS FOR ANTIREFLECTIVE SURFACES AND METHODS OF PREPARATION

BACKGROUND OF THE INVENTION

The transparency of glass or plastic, in the form of doors, windows, lenses, filters, display devices (e.g., display panels) of electronic equipment, and the like, can be impaired by glare or reflection of light. To reduce the amount of glare, for example, on plastic or glass, the surface typically includes a single layer of a metal oxide (such as silicon dioxide), a metal fluoride, a metal nitride, a metal sulfide, or the like. Such coatings function as antireflective coatings.

Glass surfaces, for example, have about 4% surface reflection. With the aid of specialized coatings, such as metal oxides, this surface reflection can be reduced to less than about 0.5% average integrated intensity in the visible region of the spectrum at 450–650 nanometers (nm). The coatings can be multilayers of dielectric materials deposited in submicrometer thicknesses arranged to cause constructive or destructive interference of light waves of different wavelength. Antireflective materials in the visible region typically consist of three or four layers, two of which are of different materials, of alternating high and low index materials. Layers of quarter-wavelength or half-wavelength in optical thickness are typically used in the design of such materials.

Antireflective (AR) film stacks prepared by vacuum deposition (e.g., vacuum sputtering) of metal oxide thin films on substrates made of plastic, particularly flexible plastic, or glass, are particularly useful in display devices of electronic equipment. Such metal oxide films are relatively porous and consist of clusters of particles forming a relatively rough profile, which helps reduce glare and reflection. When such materials are conductive, they also help reduce static discharge and electromagnetic emissions. Thus, the primary application for these coatings is to provide contrast enhancement and antireflective properties to improve the readability of display devices, such as computer monitors.

Vacuum deposited (e.g., sputtered) metal oxide antireflective coatings are generally durable and uniform. Also, their optical properties are controllable, which makes them very desirable. They also have very high surface energies and refractive indices, however. The high surface energy of a vacuum deposited (e.g., sputtered) metal oxide surface makes it prone to contamination by organic impurities (from sources such as fingerprints). The presence of surface contaminants results in a major degradation of antireflectivity properties of the metal oxide coatings. Furthermore, because of the high refractive indices, surface contamination becomes extremely noticeable to the end-user.

Unfortunately, the high surface energy makes a vacuum deposited (e.g., sputtered) metal oxide surface difficult to clean without the use of environmentally undesirable solvent-based cleaners. Furthermore, removal of the surface contaminants can detrimentally affect the antireflective properties of the surface if the cleaning process leaves residue behind. Thus, a need exists for a protective coating on an antireflective surface that is relatively durable, and more resistant to contamination and easier to clean than the antireflective surface itself.

Numerous attempts have been made to provide antisoiling characteristics to an antireflective surface. This has been accomplished by providing antisoiling characteristics to the antireflective coating itself, or by providing an antisoiling coating over the antireflective coating. Examples of such antisoiling overcoatings are described in Applicants' Assignee's copending patent application U.S. Ser. No. 08/902,666, filed Jul. 30, 1997 (Pellerite et al.), and in JP Document 9-127307 (Sony Corp.) and U.S. Pat. No. 5,622, 784 (Okaue et al.). The materials disclosed in the former document, however, are not generally appropriate for continuous coating techniques. Materials disclosed in the latter two documents, which are within the general type of compounds used in Comparative Examples B, I, O, and P herein, do not provide sufficiently durable antisoiling coatings. Although perfluoroether derivatives, such as that commercially available under the trade designation KRYTOX 157 FS(L) from E.I. DuPont de Nemours Co., Wilmington, Del., have been used as lubricants on surfaces of magnetic media articles and hard discs, they, alone, provide little antisoiling characteristics when applied to a transparent substrate as shown in Comparative Example D herein. Thus, a need still exists for materials that form durable antisoiling coatings suitable for application to substrates, particularly flexible substrates, in continuous coating techniques.

SUMMARY OF THE INVENTION

The present invention provides a protective coating on an antireflective surface that is relatively durable, and more resistant to contamination and easier to clean than the antireflective surface itself. That is, the present invention provides an antireflective article comprising a substrate having an antireflective surface and an antisoiling coating thereon. The antisoiling coating is at least partially cured (i.e., solidified as by polymerizing and/or crosslinking) and comprises a fluorinated siloxane prepared by applying a coating composition (typically, in the form of a solution) comprising at least one fluorinated silane of the following formula (1):

wherein: $R_f$ is a monovalent or divalent polyfluoropolyether group; $R^1$ is a divalent alkylene group, arylene group, or combinations thereof, optionally containing one or more heteroatoms or functional groups and optionally substituted with halides, and preferably containing about 2 to about 16 carbon atoms; $R^2$ is a lower alkyl group (i.e., a ($C_1$–$C_4$)alkyl group); Y is a halide, a lower alkoxy group (i.e., a ($C_1$–$C_4$) alkoxy group, preferably, a methoxy or ethoxy group), or a lower acyloxy group (i.e., —OC(O)$R^3$ wherein $R^3$ is a ($C_1$–$C_4$)alkyl group); x is 0 or 1; and y is 1 ($R_f$ is monovalent) or 2 ($R_f$ is divalent). Suitable compounds typically have a molecular weight (number average) of at least about 1000. Preferably, Y is a lower alkoxy group and $R_f$ is a perfluoropolyether group.

The antireflective surface preferably includes a metal oxide film having one or more metal oxides, which have been preferably vacuum deposited metal (e.g., sputter coated).

The antisoiling coating is preferably at least about 15 Angstroms thick, and preferably no greater than about 150 Angstroms thick, for a desirable balance in performance with respect to antisoiling, durability, and antireflectance. Preferably, the antireflective article has a first surface antireflectivity that is different by less than about 0.5 percentage units from that of the same article without the antisoiling coating.

The present invention also provides an antisoiling coating composition comprising at least one fluorinated silane having a number average molecular weight of at least about 1000 represented by formula I above. Preferably, the coating composition (as opposed to the coating which is at least partially cured), includes a nonchlorinated solvent. The nonchlorinated solvent is preferably selected from the group of a fluorinated alkane, an alkyl perfluoroalkyl ether, and mixtures thereof. More preferably, it is an alkyl perfluoroalkyl ether. Preferably, the coating composition includes a fluorinated silane at a concentration of less than about 2.0 weight percent.

The present invention further provides a method of applying an antisoiling coating to a substrate having an antireflective surface, the method involves treating the antireflective surface with a coating composition comprising at least one fluorinated silane having a number average molecular weight of at least about 1000 represented by formula I above. Preferably, the method of applying includes a continuous process of applying which can be carried out with a continuous roll coater, such as a gravure coater, for example. Preferably, gravure coating includes feeding the coating composition to a doctor blade, transferring the coating composition from the doctor blade to a gravure roll, and applying the coating composition to the antireflective surface of the substrate from the gravure roll.

The coated substrate can be dried and at least partially cured by allowing it to stand under ambient conditions (i.e., room temperature, pressure, and humidity), as long as there is sufficient water present (as from atmospheric humidity) for the silane groups to hydrolyze and condense with each other and with the antireflective substrate surface. Alternatively, the coated substrate can be heated to a temperature of at least about 100° C. to at least partially cure the coating.

The present invention also provides an antireflective article comprising: a transparent substrate, preferably, a flexible organic substrate, having a first surface and a second surface; an antireflective coating on at least a portion of the first surface; and an antisoiling coating comprising siloxane groups and polyfluoropolyether segments covalently bonded to silicon via organic linking groups, wherein the polyfluoropolyether segments have a molecular weight of at least about 1000. Preferably, the organic linking groups include nitrogen atoms, and the antisoiling coating has a fluorine atom to nitrogen ratio atom of about 25 to about 150.

DETAILED DESCRIPTION OF PREFERRED EMBODIMENTS

Antireflective coatings may include one or more layers of material disposed on a transparent (i.e., light transmissive) substrate, such as glass, quartz, or organic polymeric substrates, including polymethyl methacrylate, polystyrene, polyvinyl chloride, polyethylene, polypropylene, polycarbonate, polyimide, and polyesters, particularly, polyethylene terephthalate. The simplest antireflective coating is a single layer of a transparent material having a refractive index less than that of the substrate on which it is disposed. Multilayer antireflective coatings include two or more layers of dielectric material on a substrate, wherein at least one layer has a refractive index higher than the refractive index of the substrate. They are often referred to as antireflective (AR) film stacks. Such AR film stacks are commercially available, for example, from Viratee Thin Films, Inc., Faribault, Minn.

Multilayer AR coatings (i.e., AR film stacks) are generally deposited by thermal evaporation, sputtering techniques, or other vacuum deposition methods. Such multilayer coatings are disclosed, for example, in International Publication No. WO 96/31343 (Southwall Technologies Inc.), U.S. Pat. No. 5,091,244 (Bjornard), U.S. Pat. No. 5,105,310 (Dickey), U.S. Pat. No. 5,147,125 (Austin), U.S. Pat. No. 5,270,858 (Dickey), U.S. Pat. No. 5,372,874 (Dickey et al.), U.S. Pat. No. 5,407,733 (Dickey), U.S. Pat. No. 5,450,238 (Bjornard et al.), and U.S. Pat. No. 5,579,162 (Bjornard et al.). The latter describes such coatings on flexible plastic, for which the antisoiling coatings of the present invention are particularly useful.

The antireflective surface can be provided by a wide variety of conventional materials. Preferably, the antireflective surface is provided by a thin metal oxide film, and more preferably, by a thin sputter coated metal oxide film. Herein, "metal oxides" include oxides of single metals (including metalloids) as well as oxides of metal alloys. Preferred metal oxides include silicon oxides, which may be depleted of oxygen (i.e., wherein the amount of oxygen in the oxide is less than the stoichiometric amount). Preferably, the metal oxide film on the outermost surface includes silicon oxides ($SiO_x$, wherein x is no greater than 2), although other suitable materials include oxides of tin, titanium, niobium, zinc, zirconium, tantalum, yttrium, aluminum, cerium, tungsten, bismuth, indium, and mixtures thereof. Specific examples include $SnO_2$, $TiO_2$, $Nb_2O_5$, $ZnO$, $ZrO_2$, $Ta_2O_5$, $Y_2O_3$, $Al_2O_3$, $CeO_2$, $WO_3$, $Bi_2O_5$, $In_2O_3$, and ITO (indium tin oxide). Sputter coated metal oxide films are preferred over thermally evaporated films because sputter coated films have higher densities and are harder, smoother, and more stable than thermally evaporated films. Although such sputter coated metal oxide films are relatively porous and consist of clusters of particles with diameters on the order of about 5 nanometers (mu) to about 30 nm as measured by atomic force microscopy, they are sufficiently impermeable to water and gases that can alter their mechanical, electrical, and optical properties.

Suitable substrates include glass and transparent thermoplastic materials such as poly(meth)acrylate, polycarbonate, polystyrene, styrene copolymers, such as acrylonitrile-butadiene-styrene copolymer and acrylonitrile-styrene copolymer, cellulose esters, particularly cellulose acetate and cellulose acetate-butyrate copolymer, polyvinyl chloride, polyolefins, such as polyethylene and polypropylene, polyimide, polyphenyleneoxide, and polyesters, particularly polyethylene terephthalate. The term "poly(meth)acrylate" (or "acrylic") includes materials commonly referred to as cast acrylic sheeting, stretched acrylic, poly(methylmethacrylate) "PMMA", poly(methacrylate), poly(acrylate), poly(methylmethacrylate-co-etllylacrylate), and the like. The substrate thickness can vary, however, for flexible organic films it typically ranges from about 0.1 mm to about 1 mm. Additionally, the organic polymeric substrate can be a laminate of two or more different thermoplastic materials adhered together, either with or without an adhesive layer therebetween. The organic polymeric substrate can be made by a variety of different methods. For example, the thermoplastic material can be extruded and then cut to the desired dimension. It can be molded to form the desired shape and dimensions. Also, it can be cell cast and subsequently heated and stretched to form the organic polymeric substrate.

The substrate on which the antireflective coating is applied may include a primed surface. The primed surface can result from the application of a chemical primer layer, such as an acrylic layer, or from chemical etching, electron-beam irradiation, corona treatment, plasma etching, or coextrusion of adhesion promoting layers. Such primed substrates are commercially available. For example, a polyethylene terephthalate substrate primed with an aqueous acrylate latex is available from Imperial Chemical Industries Films, Hopewell, N.C. under the trade designations ICI 454 and ICI 617.

The substrate may also include an adhesion-enhancing coating to improve adhesion between the antireflective coating and the substrate. Such coatings are commercially available. A preferred adhesion-enhancing coating is that described in Applicants' Assignee's copending patent application U.S. Ser. No 09/013,991, filed on Jan. 27, 1998, entitled "Adhesion-Enhancing Coating for Optically Functional Materials and Methods of Preparation." The adhesion-enhancing coating is particularly desirable for use on flexible organic polymeric substrates. In addition to enhancing adhesion of the antireflective coating to a primed or unprimed organic polymeric substrate, an adhesion-enhancing coating may also provide increased durability to an antireflective coating on a flexible organic polymeric substrate by improving the scratch resistance of the antireflective coating so that it more closely mimics the hardness of an AR coating on glass. A cured adhesion-enhancing coating typically has a coating thickness of at least about I micron, and preferably, at least about 2 microns. It can be of any thickness, but is typically no greater than about 50 microns, preferably, no greater than about 25 microns, more preferably, no greater than about 10 microns, and most preferably, no greater than about 4 microns.

A preferred adhesion-enhancing coating, which is described in Applicants' Assignee's copending patent application U.S. Ser. No. 09/013,991, filed on Jan. 27, 1998, includes an organic matrix and inorganic oxide particles dispersed therein. Such an adhesion-enhancing coating is prepared from a precursor composition that includes a ceramer composition and optionally one or more solvents. The ceramer composition preferably includes substantially non-aggregated, colloidal inorganic oxide particles dispersed in a curable organic binder composition. Preferably, the ceramer composition has a refractive index of about 1.40 to about 1.65, as measured with a conventional refractometer using a conventional measurement procedure, such as ASTM D1747-94 ("Standard Test Method for Refractive Index of Viscous Materials"). The curable organic binder composition can include a variety of monomers, oligomers, and/or polymers that can form a cured matrix for inorganic oxide particles. Preferably, a ceramer composition includes an ethylenically unsaturated monomer, an optional organo-functional silane monomer coupling agent, and inorganic colloidal particles that at least include silica. An alternative ceramer composition includes an organofunctional silane monomer coupling agent and inorganic colloidal particles that at least include silica. Once the organic polymeric substrate is coated with the adhesion-enhancing coating, and at least partially cured, an antireflective coating may be applied on the adhesion-enhancing coating.

The present invention provides an antisoiling coating for an antireflective surface, particularly the outer surface of an antireflective film stack, or any surface having thereon an antireflective film, preferably, an antireflective metal oxide film (preferably, having one or more metal oxides), and more preferably, a sputter coated antireflective metal oxide film (preferably, comprising silicon oxides). An antisoiling coating of the present invention renders a surface more resistant to contamination, as by skin oils from fingerprints, for example. It also renders the surface easier to clean, preferably either with dry wiping or with water. It is also capable of withstanding multiple cleanings. Furthermore, it is relatively easy to apply, and causes little or no disruption of the optical properties of the surface to which it is applied, particularly the antireflective surface of a film stack. That is, an antisoiling coating of the present invention does not significantly increase the reflectivity of the film stack.

The articles of the present invention include a substrate, such as glass or an organic polymeric substrate, preferably, a flexible organic polymeric substrate, optionally having a primed surface on which is coated an optional adhesion-enhancing coating, an antireflective coating, preferably, a multilayer film stack, and an antisoiling coating of the present invention. Preferably, the substrate is flexible and the entire article can be stored in roll form.

On the opposite surface of the substrate is preferably a layer of an adhesive and a liner thereon. The adhesive can be chosen from a wide variety of pressure sensitive adhesives such as that described in Applicants' Assignee's copending patent application U.S. Ser. No. 09/013,991, filed on Jan. 27, 1998, (Attorney Docket No. 53892 USA 2A). A particularly useful adhesive is a water-resistant pressure sensitive adhesive comprising (a) 50–90 wt % n-butyl acrylate, and (b) 10–50 wt % 2-hydroxy ethyl acrylate, 2-hydroxy ethyl methacrylate, hydroxy propyl acrylate monomer, or mixtures thereof. The water-resistant emulsion pressure sensitive adhesive exhibits less than 2% increase in haze, less than 2% increase in opacity, and greater than approximately 95% transmittance in the visible spectrum ranging from 380 nm to 720 nm after wet lamination process. The water-resistant emulsiton pressure sensitive adhesive may optionally contain copolymerizable monomers selected from the group of alkylacrylate monomers (preferably, 0–50 wt %), polar monomers (preferably, 0–5 wt %), ethylenically unsaturated free radically polymerizable monomers (preferably, 0–50 wt %), or mixtures thereof. Other optional components of the water-resistant emulsion pressure sensitive adhesive include multifunctional crosslinking agents. If present, these crosslinking agents are present in amounts ranging from 0 to approximately 10 wt %.

An antisoiling coating of the present invention includes a fluorinated siloxane film (i.e., a fluorine-containing organopolysiloxane film having Si—O—Si bonds), with an organic group that optionally includes heteroatoms and/or functional groups. Polyfluoropolyether segments are bonded to the silicon atoms through organic linking groups. Unlike the preferred antisoiling coatings of Applicants' Assignee's copending patent application U.S. Ser. No. 08/902,664, filed Jul. 30, 1997, the coatings of the present invention are typically not self-assembling. Furthermore, the coatings of the present invention are not typically a covalently attached monolayer of material with oligomeric material adsorbed on the monolayer.

The overall coating thickness results from balancing the desire for a thick coating for enhancing antisoiling and durability properties with the desire for a thin coating for maintaining the antireflective properties of the AR substrate. Advantageously, the coating compositions of the present invention can provide dried or cured (or at least partially cured) coatings that can be relatively thin yet possess desirable antisoiling and durability characteristics. Typically, the overall coating thickness of an antisoiling coating of the present invention is greater than about 15 Angstroms thick, preferably, greater than about 20 Angstroms thick, and more preferably, greater than about 50 Angstroms thick. Thicker coatings can be obtained if desired, although it is preferred that the coating thickness be no greater than about 500 Angstroms, more preferably, no greater than about 300 Angstroms, and most preferably, no greater than about 150 Angstroms thick.

An antisoiling coating of the present invention can be applied to the antireflective surface (or portion thereof) of a transparent substrate (i.e., an AR substrate) by a variety of techniques. Preferably, the antireflective surface is treated with a coating composition (typically, a solution) comprising a fluorine-substituted silane (i.e., a fluorinated silane). As used herein, a "silane" includes acyloxy substituted silanes, halo substituted silanes, and alkoxy substituted silanes. All surfaces or a portion of only one surface of the substrate may be treated, although advantageously only the upper surface of the AR substrate (i.e., the antireflective surface) is coated.

Preferably, the fluorinated silane is of the following formula (I):

$$R_f\text{—}[\text{—}R^1\text{—}SiY_{3-x}R^2{}_x]_y \qquad (I)$$

wherein: $R_f$ is a monovalent or divalent polyfluoropolyether group; the connecting group $R^1$ is a divalent alkylene group, arylene group, or combinations thereof, optionally containing one or more heteroatoms (e.g., oxygen, nitrogen, or sulfur) or functional groups (e.g., carbonyl, amido, or sulfonamido) and optionally substituted with halogen atoms, preferably containing about 2 to about 16 carbon atoms (more preferably, about 3 to about 10 carbon atoms); $R^2$ is a lower alkyl group (i.e., a ($C_1$–$C_4$)alkyl group, preferably, a methyl group); Y is a halide, a lower alkoxy group (i.e., a ($C_1$–$C_4$)alkoxy group, preferably, a methoxy or ethoxy group), or a lower acyloxy group (e.g., —OC(O)$R^3$ wherein $R^3$ is a ($C_1$–$C_4$)alkyl group); x is 0 or 1; and y is 1 ($R_f$ is monovalent) or 2 ($R_f$ is divalent). Suitable compounds typically have a number average molecular weight of at least about 1000, and preferably, at least about 1500. Preferably, x=0 and Y is a lower alkoxy group.

The polyfluoropolyether group ($R_f$) can include linear, branched, and/or cyclic structures, that may be saturated or unsaturated, and substituted with one or more oxygen atoms. It is preferably a perfluorinated group (i.e., all C-H bonds are replaced by C-F bonds). More preferably, it includes perfluorinated repeating units selected from the group of —($C_nF_{2n}$)—, —($C_nF_{2n}$O)—, —(CF(Z))—, —(CF(Z)O)—, —(CF(Z)$C_nF_{2n}$O)—, —($C_nF_{2n}$CF(Z)O)—, —(CF$_2$CF(Z)O)—, and combinations thereof. In these repeating units Z is a perfluoroalkyl group, an oxygen-substituted perfluoroalkyl group, a perfluoroalkoxy group, or an oxygen-substituted perfluoroalkoxy group, all of which can be linear, branched, or cyclic, and preferably have about 1 to about 9 carbon atoms and 0 to about 4 oxygen atoms. Examples of polyfluoropolyethers containing polymeric moieties made of these repeating units are disclosed in U.S. Pat. No. 5,306,758 (Pellerite). The number of repeat units in the polyfluoropolyether group ($R_f$) is sufficient to form a compound having a number average molecular weight of at least about 1000, and preferably, sufficient to form a polyfluoropolyether group having a number average molecular weight of at least about 1000. For the monovalent polyfluoropolyether group (wherein y is 1 in formula I above), the terminal groups can be ($C_nF_{2n+1}$)—, ($C_nF_{2n+1}$O)—, (X'$C_nF_{2n}$O)—, or (X'$C_nF_{2n+1}$)— wherein X' is H, Cl, or Br, for example. Preferably, these terminal groups are perfluorinated. In these repeating units or terminal groups, n is 1 or more, and preferably about 1 to about 4.

Preferred approximate average structures for a divalent perfluoropolyether group include —CF$_2$O(CF$_2$O)$_m$(C$_2$F$_4$O)$_p$CF$_2$—, —CF(CF$_3$)O(CF(CF$_3$)CF$_2$O)$_p$CF(CF$_3$)—, —CF$_2$O(C$_2$F$_4$O)$_p$CF$_2$—, and —(CF$_2$)$_3$O(C$_4$F$_8$O)$_p$(CF$_2$)$_3$—, wherein an average value for m is 0 to about 50 and an average value for p is 0 to about 50, with the proviso that both m and p cannot be 0 in the same group. Of these, particularly preferred approximate average structures are —CF$_2$O(CF$_2$O)$_m$(C$_2$F$_4$O)$_p$CF$_2$—, —CF$_2$O(C$_2$F$_4$O)$_p$CF$_2$—, and —CF(CF$_3$)O(CF(CF$_3$)CF$_2$O)$_p$CF(CF$_3$)—. Particularly preferred approximate average structures for a monovalent perfluoropolyether group include C$_3$F$_7$O(CF(CF$_3$)CF$_2$O)$_p$CF(CF$_3$)— and CF$_3$O(C$_2$F$_4$O)$_p$CF$_2$— wherein an average value for p is 0 to about 50. As synthesized, these compounds typically include a mixture of polymers. The approximate average structure is the approximate average of the mixture of polymers.

The divalent $R^1$ group can include linear, branched, or cyclic structures, that may be saturated or unsaturated. The $R^1$ group can contain one or more heteroatoms (e.g., oxygen, nitrogen, or sulfur) or functional groups (e.g., carbonyl, amido, or sulfonamido). It can also be substituted with halogen atoms, preferably, fluorine atoms, although this is less desirable, as this might lead to instability of the compound. Preferably, the divalent $R^1$ group is a hydrocarbon group, preferably, a linear hydrocarbon group, optionally containing heteroatoms or functional groups, and more preferably, containing at least one functional group. Examples of $R^1$ groups include —C(O)NH$_2$(CH$_2$)$_3$—, —CH$_2$O(CH$_2$)$_3$—, and —(C$_n$H$_{2n}$)—, wherein n is about 2 to about 6. A preferred $R^1$ group is —C(O)NH$_2$(CH$_2$)$_3$—.

Compounds of formula 1 suitable for use in making antisoiling coatings of the present invention have a molecular weight (number average) of at least about 1000, and preferably, at least about 1500. Typically, they are no greater than about 5000, but this is typically limited by availability, viscosity, and ease of cure, and preferably, no greater than about 3000, depending upon the viscosity and cure time characteristics desired.

Examples of preferred fluorinated silanes include, but are not limited to, the following approximate average structures:
XCF$_2$O(CF$_2$O)$_m$(C$_2$F$_4$O)$_p$CF$_2$X, C$_3$F$_7$O(CF(CF$_3$) CF$_2$O)$_p$CF(CF$_3$)X, XCF(CF$_3$)O(CF(CF$_3$)CF$_2$O)$_p$CF(CF$_3$)X, XCF$_2$O(C$_2$F$_4$O)$_p$CF$_2$X, and
CF$_3$O(C$_2$F$_4$O)$_p$CF$_2$X, X(CF$_2$)$_3$O(C$_4$F$_8$O)$_p$(CF$_2$)$_3$X, wherein —X is —$R^1$—SiY$_{3-x}R^2{}_x$ as defined above in formula 1 or a nonsilane-containing terminal group as defined above (($C_nF_{2n+1}$)—, ($C_nF_{2n+1}$)—, (X'$C_nF_{2n}$O)—, or (X'$C_nF_{2n+1}$O)— wherein X' is H, Cl, or Br), with the proviso that at least one X group per molecule is a silane. Preferably, in each silane $R^1$ preferably includes nitrogen. More preferably, at least one X group per molecule is C(O)NH(CH$_2$)$_3$Si(OR)$_3$ (wherein R is methyl, ethyl, or mixtures thereof), and the other X group if not a silane is OCF$_3$, or OC$_3$F$_7$. The values of m and p in these approximate average structures can vary, as long as the material has a number average molecular weight of at least about 1000. Preferably, an average value of m is within a range of about 1 to about 50, and an average value of p is within a range of about 4 to about 40. As these are polymeric materials, such compounds exist as mixtures upon synthesis, which are suitable for use. These mixtures may also contain perfluoropolyether chains bearing no functional groups (inert fluids) or more than two terminal groups (branched structures) as a consequence of the methods used in their synthesis. Typically, mixtures of polymeric materials containing less than about 10% by weight of nonftinctionalized polymers (e.g., those without silane groups, for to example) can be used. Furthermore, mixtures of any of the individually listed compounds of formula I can be used.

The compounds of formula I can be synthesized using standard tecminiques. For example, commercially available or readily synthesized perfluoropolyether esters can be combined with a functionalized alkoxysilane, such as a 3-aminopropylalkoxysilane, according to U.S. Pat. No. 3,810,874 (Mitsch et al.). Modifications of this method are described in the Examples. Such materials may or may not need to be purified before use in an antisoiling composition.

Although the inventors do not wish to be bound by theory, compounds of the above formula I are believed to undergo reaction with the substrate surface to form a siloxane coating that has a strong interaction with the antireflective surface, through the formation of covalent bonds, for example. In this context, "siloxane" refers to —Si—O—Si— bonds to which are attached polyfluoropolyether segments (such as the $R_f$ groups in formula I herein), preferably, perfluoropolyether segments, bonded to the silicon atoms through organic linking groups optionally containing heteroatoms or functional groups (such as the $R^1$ groups in formula I herein). In a cured coating (or an at least partially cured coating), the polyfluoropolyether segments preferably have a number average molecular weight of at least about 1000. In particularly preferred embodiments, the $R^1$ groups include nitrogen atoms (as in an amido group), and the ratio of fluorine atoms to nitrogen atoms in the coating is within a range of about 25 to about 150. A coating prepared from a coating composition that includes compounds of formula I can also include unreacted or uncondensed silanol groups.

For the preparation of a durable coating, sufficient water should be present to cause the formation of such an interaction between the fluorinated siloxane coating and the antireflective surface. It is believed that the interaction is formed as a result of hydrolysis of the silane end groups with residual water, which is either in the coating composition or adsorbed to the substrate surface, for example, and then condensation of the resulting silanol groups on and to the antireflective surface. Thus, in addition to the formation of Si—O—Si bonds, it is believed that M—O—Si bonds are formed wherein M represents a metal (which is used herein to includes metalloid) of the substrate. Typically, sufficient water is present for the preparation of a durable coating if the coating method is carried out at room temperature in the atmosphere having a relative humidity of about 30% to about 55%.

An antisoiling coating composition of the present invention preferably includes one or more solvents. The solvent(s) used in the antisoiling coating composition preferably include those that are substantially inert (i.e., substantially nonreactive with the fluorinated silane), aprotic, and capable of dispersing or dissolving (preferably, substantially completely dissolving) the fluorinated silane. Examples of appropriate solvents include, but are not limited to, fluorinated hydrocarbons, particularly fluorine-substituted alkanes, ethers, particularly alkyl perfluoroalkyl ethers, and hydrochlorofluoro alkanes and ethers. More preferably, the solvent(s) are nonclhlorinated and nonflammable. Mixtures of such solvents can be used. Particularly preferred solvents, because of a good balance of solubilization and flammability properties, include alkyl perfluoroalkyl ethers such as methyl perfluorobutyl ether and ethyl perfluorobutyl ether.

A coating composition of the present invention containing a desired solvent or mixture of solvents and a fluorinated silane may also include additives, such as HCl scavengers, catalysts, and odor masking agents, provided they do not react with the fluorinated silane. The catalysts can be any of the catalysts typically used to cure reactive organosilanes by hydrolysis and condensation. Examples of catalysts suitable for use in thermally cured systems include, for example, alkyl tin esters such as dibutyltin diacetate; titanate esters such as tetraisopropyl titanate; acids such as mineral acids, alkylsulfonic acids, carboxylic acids, halogenated carboxylic or alkylsulfonic acids, and fluorinated sulfonamides or sulfonimides; and bases such as trialkylamines. Examples of catalysts suitable for use in UV cured or electron beam cured systems include, for example, iodonium compounds and sulfonium compounds such as those disclosed in Applicants' Assignee's copending patent application Ser. No. 08/815,029, filed Mar. 14, 1997.

Preferably, the AR substrate should be extremely clean prior to applying the antisoiling coating for optimum coating characteristics, particularly durability, to be obtained. That is, the AR surface of the substrate to be coated should be substantially free of organic contamination prior to coating. Cleaning techniques depend on the type of substrate and include, for example, ultrasound cleaning in a solvent bath (e.g., ethanol/chloroform), gas-phase discharge techniques such as air corona treatment, washing with detergent and/or hot water (e.g., about 48° C. to about 67° C.), or combinations of these techniques.

A wide variety of coating methods can be used to apply an antisoiling coating composition of the present invention, such as spray coating, knife coating, dip coating, meniscus coating, flow coating, roll coating, and the like. For coating rigid substrates, dip coating, spray coating, and meniscus coating are typically used. For coating flexible substrates, a wide variety of conventional roll coating techniques can be used, such as squeeze coating, kiss coating, gravure coating, etc. A preferred coating method for application of a coating composition of the present invention to a web or flexible substrate is a continuous process, as can be conducted using gravure coating. Because a relatively volatile solvent is preferably included in an antisoiling coating composition of the present invention, a more preferred gravure coating method for application of an antisoiling coating composition includes the use of a two-roll stack design. In this roll configuration, the lower roll is a soft roll and the upper roll is a gravure roll. The web is supported by the soft roll. The coating solution is metered and delivered by means of a pump to a doctor blade, which acts as a reservoir. As the gravure roll turns, it comes in direct contact with the coating solution. The amount of solution that deposits on the gravure roll is predetermined by the total carrying capacity of the cells engraved on the gravure roll. The gravure roll transfers the coating solution directly onto the antireflective surface of the substrate. That is, the coating composition is directly applied to the antireflective surface of the substrate using the gravure roll and the oppositely positioned soft roll provides a uniform pressure from the underside of the substrate so as to form a relatively thin antisoiling coating.

An antisoiling coating composition is typically a relatively dilute solution, preferably containing less than about 2.0 weight percent of the fluorinated silane, more preferably, less than about 0.5 weight percent of the fluorinated silane, and most preferably, less than about 0.3 weight percent of the fluorinated silane. A substrate to be coated can typically be contacted with the coating composition (typically, a coating solution) at room temperature (typically, about 20° C. to about 25° C.).

Typically, after an antisoiling coating composition is applied to an AR substrate, the solvent used is allowed to evaporate or flash off and the dried composition is allowed to at least partially cure to impart mechanical stability. This can be carried out in one step or multiple steps. Typically, drying and curing can occur by allowing the coated substrate to stand in a humid environment (e.g., at room temperature in the atmosphere having a relative humidity of about 30% to about 55%), or by applying thermal energy, infrared radiation, ultraviolet radiation, electron beam radiation, or visible radiation. The longer the coated substrate is allowed to stand, typically, the greater the extent of cure. Although not preferred, the process may also require a polishing step or solvent washing step after applying an antisoiling coating composition to remove excess material that can detrimentally affect the antireflective properties of the coating.

If thermal energy is used to dry and/or cure an antisoiling coating, the conditions are chosen to at least partially cure the coating. This typically includes drying or curing at a temperature that does not destroy the integrity of the article (e.g., at a temperature that does not melt the substrate). Preferably, the temperature is at least about 100° C., and more preferably, at least about 120° C., and typically, no greater than the melt temperature of the substrate. Preferably, the time required to dry and/or at least partially cure the coating composition is at least about 1 minute, and more preferably, at least about 2 minutes. For enhanced performance, typically, the coating composition is allowed to substantially completely cure. A sufficient level of cure can be determined by the Ink Test and/or Abrasion Test described herein. Whether partially or completely cured, a suitable coating is one that causes dewetting and beading or at least a very thin continuous line of ink that can be easily removed with a dry cloth as described in the Ink Test. A preferred coating is one that does this even after being subjected to abrasion as described in the Abrasion Test.

Electron beam radiation can be used at an energy level of about 0.1 to about 10 megarad (Mrad), preferably at an energy level of about 1 to about 10 Mrad. Ultraviolet radiation refers to nonparticulate radiation having a wavelength within the range of about 200 to about 400 nm, preferably within the range of about 250 to 400 nm. Visible radiation refers to nonparticulate radiation having a wavelength within the range of about 400 nm to about 650 nm, preferably in the range of about 400 nm to about 550 nm. UV and visible light curing is preferred because there tends to be very little, if any, damage of the thermoplastic material when they are used as the energy source for curing the composition.

An antisoiling coating of the present invention, typically of at least about 15 Angstroms thick, provides significant resistance to soiling by common organic contaminants such as fingerprints and solvent-based inks. That is, an antisoiling coating of the present invention shows much less tendency to become soiled by fingerprints, for example, than do AR substrates with no antisoiling coating. Fingerprints that accumulate can be removed easily from an antisoiling coating of the present invention, either with a dry wipe or with water as a cleaner. Such contamination is not easily removed from untreated substrates, for which solvent-based cleaners must be used.

Antisoiling characteristics can be demonstrated by use of an ink challenge test, as disclosed in Example 1 of U.S. Pat. No. 5,382,639 (Moore et al.). In this test, ink is applied to the surface of a coated substrate from a permanent marking pen. Preferably, the coating causes dewetting and beading (i.e., a discontinuous line) or at least a very thin continuous line of the ink, which allows easy cleaning with a dry tissue. That is, preferably, the ink beads up into small discrete droplets that can be wiped away easily with a dry tissue leaving little or no trace of residue and little or no change in the antireflectivity of the substrate. Preferably, this ink challenge can be repeated numerous times with little or no loss of initial performance. For example, the ink challenge test can be repeated at least 5 times with no erosion of performance (i.e., no erosion of the antisoiling characteristics as measured by ink dewetting and beading). In contrast, untreated samples are receptive to the permanent ink, which can typically only be removed by solvent-assisted cleaning.

Preferred coatings are ones that cause dewetting and beading or at least a very thin continuous line of the ink that can be easily removed with a dry tissue even after being subjected to abrasion as described in the Abrasion Test. Typically, the more harsh the abrading conditions a coating can withstand, the more durable and desirable the coating.

Significantly, an antisoiling coating of the present invention, having a thickness of about 150 Angstroms or less, has little effect on the reflective characteristics of the AR substrate as compared to an AR substrate that does not include an antisoiling coating. Thus, an antisoiling coating of the present invention does not substantially change the anti reflectivity of the antireflective article on which it is coated. For example, on a sample that is coated on only a portion of its surface with an antisoiling coating of the present invention having a thickness of about 150 Angstroms or less, the boundary between coated and uncoated areas is barely detectable to the naked eye.

Surface reflectance measurements used herein are reported in percentage of the first surface reflectance as the integrated average over the visible spectrum (450–650 nm). First surface reflectance is the result of the interference patterns from the multilayer stack, the optional adhesion-enhancing coating, the optional primer layer, and the substrate, whereas the second surface reflectance is from the back side of the substrate.

The lower the percentage figure for the first surface reflectance, the less the tendency of the antireflective surface to produce mirror images. Typically, reflectivity measurements of a coated substrate of the present invention show little change (i.e., substantially no change) relative to uncoated controls. Preferably, the difference (increase or decrease) between the first surface reflectance measurement after treatment and the first surface reflectance measurement before treatment is less than about 0.5 percent (which is simply the difference between the reflectance percentages, i.e., a difference of less than about 0.5 percentage units, and not a percentage difference), more preferably, than about 0.2 percent, even more preferably, less than about 0.1 percent and, most preferably, less than about 0.05 percent, wherein treatment includes coating an antireflective surface with a 0.1 weight percent solution of a fluorinated silane in accordance with the present invention in methyl perfluorobutyl ether using a #6 wire-wound rod, followed by solvent evaporation and curing of the coating at 120° C. Below about 0.5 percent specular reflection, it becomes difficult to see the reflected image. An antireflective surface with a first surface reflectance of greater than about 1.5 percent, typically, up to about 4.0 percent, is generally considered to be of low quality for optical applications.

EXPERIMENTAL EXAMPLES

Advantages of the invention are illustrated by the following examples. However, the particular materials and amounts thereof recited in these examples, as well as other conditions and details, are to be interpreted to apply broadly in the art and should not be construed to unduly limit the invention.

Materials

Methyl perfluorobutyl ether was obtained from 3M Chemicals, 3M Company, St. Paul, Minn., under the trade designation HFE-7100. The alkoxysilanes 3-aminopropyltrimethoxysilane and 3-aminopropyltriethoxysilane were obtained from Aldrich Chemical Co., Milwaukee, Wis., while 3-aminopropylmethyldiethoxysilane was obtained from Gelest, Inc., Tullytown, Pa. The fluorinated silanes $C_7F_{15}CH_2OCH_2CH_2CH_2SiCl_3$ and $C_7F_{15}CH_2OCH_2CH_2CH_2Si(OC_2H_5)_3$ were prepared as described in U.S. Pat. No. 5,274,159 (Pellerite et al.) in Examples 1 and 5, respectively; $C_7F_{15}CONHCH_2CH_2CH_2Si(OCH_3)_3$ was prepared as described in U.S. Pat. No. 5,274,159 (Pellerite et al.) in Example 9; and $C_2F_5OC_2F_4OCF_2CONHCH_2CH_2CH_2Si(OCH_3)_3$ was prepared as described in U.S. Pat. No. 5,274, 159 (Pellerite et al.) in Example 17.

Perfluoropolyether ester $CH_3O_2CCF_2O(CF_2O)_m(C_2F_4O)_p CF_2CO_2CH_3$ (<m> and <p>≈9–11, wherein <> refers to an average value) was obtained from Ausimont USA, Morristown, N.J., under the trade designation FOMBLIN Z-DEAL. Fluorinated poly(ethyleneoxide) esters $CH_3O_2CCF_2O(C_2F_4O)_nCF_2CO_2CH_3$ (F-PEO) and $CF_3O(C_2F_4O)_nCF_2CO_2CH_3$ (F-MPEG) were obtained as described in U.S. Pat. No. 5,488,142 (Fall et al.) in Example 2 (starting from polyethylene glycol diacetates and polyethylene glycol monomethyl ether acetates, respectively), while the fluorinated poly(tetramethyleneoxide) ester (F-PTMO) $CH_3O_2C(CF_2)_3O(C_4F_8O)_n(CF_2)_3CO_2CH_3$ was obtained as described in U.S. Pat. No. 5,488,142 (Fall et al.) as described in Example 1. The average functionality of materials designated as F-PEO and F-PTMO diesters was generally less than 2 ester groups per molecule, meaning that these materials also contained varying amounts of monoester (e.g., those with —$OCF_3$ as the other end group) and inert perfluoropolyether chains (e.g., those with no functionality). Values of the average ester functionality as determined by fluorine-19 NMR analysis are given in percentages in the examples where relevant. Perfluorinated monocarboxylic acid $(C_3F_7O(CF(CF_3)CF_2O)_nCF(CF_3)CO_2H$, <n>≈10) and difunctional methyl ster $(CH_3O_2CCF(CF_3)O(CF(CF_3)CF_2O)_nCF(CF_3)CO_2CH_3$, <n>≈10) were obtained from E.I. DuPont de Nemours Co., Wilmington, Del. under the trade esignation KRYTOX (the perfluorinated monocarboxylic acid is more specifically referred to as KRYTOX 157 FS(L)). Typically, the carboxylic acid was converted to the acid chloride by treatment with thionyl chloride, followed by methanolysis to yield the methyl ester prior to conversion to a silane.

For Examples 1–30 and Comparative Example A, perfluoropolyether esters were converted to alkoxysilane-functional derivatives by treatment with the desired 3-aminopropylalkoxysilane, as taught in U.S. Pat. No. 3,810,874 (Mitsch et al.) in Table 1, at line 6. This exothermic reaction proceeds readily at room temperature simply by mixing the starting materials. The progress of reaction was monitored by infrared analysis, as the ester carbonyl band at about 1790 cm$^{-1}$ disappeared and was replaced by amide carbonyl absorption at about 1715 cm$^{-1}$. If a methyl ester is combined with an ethoxysilane, for example, exchange can occur such that the resultant product can include methoxysilane and ethoxysilane groups. For Examples 1–30 and Comparative Example A, the products were used without further purification or removal of the byproduct alcohol.

Substrate

The substrate coated in the Examples below was a polyester film having a thickness of about 4–7 mils (0.1–0.18 mm) coated with an acrylate latex based primer layer, commercially available under the trade designation ICI 617 from Imperial Chemical Industries Films, Hopewell, Va. The substrate also included an adhesion-enhancing coating formed from a ceramer composition prepared by mixing 1195 grams (g) of NALCO 2327 silica sol (an ammonium ion-stabilized dispersion (40% solids) of colloidal silica particles having a pH of 9.3 and average particle diameter of 20 nanometers (nm), available from Nalco Chemical Co., Chicago, Ill. 118 g of N,N-dimethyl acrylamide, 120 g of 3-(trimethoxysilyl) propyl methacrylate coupling agent, and 761 g of pentaerythritol triacrylate (all three available from Aldrich Chemical Company, Inc., Milwaukee, Wis.). This ccramer composition was combined with isopropanol and a photoinitiator (4 parts ceramer, 21 parts isopropanol, and 0.14 part IRGACURE 184 photoinitiator, available from Ciba-Geigy, Hawthorn, N.Y.) and was coated on one surface of the substrate using a method similar to that described in Example 1 of Applicants' Assignee's copending U.S. patent application Ser. No. 09/013,991, filed on Jan. 27, 1998 except a gravure coater was used to continuously coat the primed polyester substrate ICI 617 at a rate of 70–90 feet/minute (21–28 meters/minute). Before reaching the cure station, the coated film was dried in a forced air oven at 67° C. to remove the isopropanol solvent, after which the dried coating passed under a pair of Fusion "H" Ultraviolet lamps (Model MC-6RQN, Fusion UV curing Inc., Rockville, Md.). The resultant adhesion-enhancing coating was about 3 microns thick. Such coating compositions can be coated in a variety of ways, whether they be continuous coating techniques or not, and cured in a variety of ways, as discussed in Applicants' Assignee's copending U.S. patent application Ser. No. 09/013,991, filed on Jan. 27, 1998.

The substrate was further coated with a conductive antireflective 4-layer coating stack of ITO and sputter-coated silicon oxide ($SiO_x$ wherein x is no greater than about 2) on top of the adhesion-enhancing coating. The bottom layer (i.e., the layer of the multilayer film stack directly on the adhesion-enhancing coating) included ITO and a top layer of the film stack included silicon oxides. The antireflective coating stack was commercially prepared by Courtaulds Performance Films, Canoga Park, Calif., under the trade designation CARC.

Methods

Antisoiling Composition Coating Method

For Examples 32–48, antisoiling compositions were applied onto an antireflective substrate prepared as described above. The antisoiling coating composition was coated by a gravure coating method. A gear pump (commercially available under the trade designation ZENITH from Parker Hannifin Corporation, Sanford, N.C.) was used to deliver the antisoiling composition to the doctor blade, which acts as a reservoir to bring the coating composition in contact with the gravure roll. The gravure roll transfers the coating solution directly onto the antireflective surface of the substrate. The doctor blade was made of cold rolled spring steel, 0.025 cm thick. The coating speed was about 1.5–7.6 meters/minute, the oven temperature was about 106–177° C., and the pump flow rate was about 3–35 cm$^3$/minute. Particular coating conditions are noted below for the specific Examples. A rubber roll commercially available from F.R. Gross Inc., Stow, Ohio supported the web as it passes through the coater.

A gravure roll (ROTO-FLOW Quad), designated G8, with a theoretical volume of 4.6 cubic billion microns/in$^2$ (capable of applying a wet coating thickness of 0.28 mils (7.1 microns)), commercially available from Pamarco, New Providence, N.J., was used in Examples 32–41. A gravure roll, designated G4, with a pyramidal engraving pattern having a theoretical volume of 2.8 cubic billion microns/in$^2$ (capable of applying a wet coating thickness of 0.17 mils (4.3 microns)) also commercially available from Pamarco, was used in Examples 42–48.

Ink Test

Antisoiling characteristics are demonstrated by application of ink from a black permanent marking pen available under the trade designation SHARPIE from Sanford Company. A "pass" indicates that the ink beads into small discrete droplets and can be wiped away with a dry tissue available under the trade designation KIMWIPE from Kimberly-Clark, Roswell, Ga., leaving no trace of residue and no change in the antireflectivity properties. A "borderline pass" means that the marked area exhibits partial or no ink beading and that the ink can be removed, but this typically requires extra force when rubbing the abraded area with a dry KIMWIPE. A "fail" indicates that the ink wets the substrate and cannot be removed by rubbino the abraded area with a dry KIMWIPE. Thus, failed samples are perfectly receptive to the permanent ink. One "cycle" of the ink test involved inking and wiping (ink/dry wipe cycle).

Abrasion Test

Samples were tested for durability by exerting a 2 kg force, perpendicular to the surface, using a brass plunger of the same construction as that specified in drawing #07680606 of Military Specification MIL-C-48497A. The plunger was outfitted with an eraser covered with 12 layers of cheese cloth of an area of about 1 cm². The plunger was secured to an arm which traveled back and forth a specified number of times. The arm was secured to a motor to ensure consistency in the repetition of the strokes. A counter was interfaced with the motor to track the number of strokes, with 2 strokes equaling one cycle. For illustration, 100 dry rubs was equivalent to 50 cycles; 1000 dry rubs was equivalent to 500 cycles, etc. To "pass" this test, the antisoiling coating caiuot have any visible evidence of coating defects, evidenced by scratching, flaking, peeling, cracking, or blistering. The abraded area is then typically challenged by the ink test described above.

Reflectance Measurements

Reflectance measurements of the coated and uncoated substrates were obtained with a spectrophotometer model UV-3101PC UV-VIS-NIR with the MPC-3100 large sample compartment, commercially available from Shimadzu Scientific Instruments, Inc., Columbia, Md. Measurements were conducted per the vendor's recommended procedure as outlined in the Shimadzu UVPC Spectroscopy Instruction Manual, Revision 3.7. The reflectance values were collected over the range of 350 nm to 800 nm, from a 12 degree incident angle, at a medium scan speed, with the slit width set at 5.0 nm and the sampling interval set on "Auto." The reflectance data reported herein is the integrated average reflectance of 450 nm to 650 nm. This range is reported because the human eye is most sensitive to the differences in reflectance in this section of the visible spectrum.

Substrate preparation involved taking a 7.5 cm×12 cm sample from the center of the substrate and sanding the back of the substrate with 3M Company's Ultra Fine 600 grit abrasive paper. The sanded surface of the substrate was then painted with 3 coats of KRYLON 1602 Ultra Flat Black spray paint, available from Sherwin-Williams Co., Solohon, Ohio. The coats of paint were allowed to dry at room temperature prior to application of another coating. Once coating and drying was completed, the samples were typically tested immediately.

Examples 1–6

The perfluoropolyether 3-amidopropylalkoxysilanes shown in Table 1 were used to prepare 0.1 percent by weight (wt %) solutions in methyl perfluorobutyl ether. Using a #6 wire-wound rod (commercially available from RD Specialties, Webster, N.Y.), each of these solutions was drawn down to make a hand spread coating on a polyester substrate as described above. The coated samples were placed in a forced-air oven at 120° C. for 2 minutes. After removal from the oven and cooling, the samples were tested with SHARPIE black permanent marker ink/dry wipe challenge cycles as described above. All of the samples showed beading of the permanent ink into discrete droplets which were easily removed using only a dry wipe. This test was repeated for a total of five ink/dry wipe cycles with no degradation in ink beading and removal performance. In contrast, a substrate that did not have an antisoiling coating on the antireflective coating was completely writable and the ink could not be removed by dry wiping.

TABLE 1

| Example | Perfluoropolyether Ester | Alkoxysilane | Product |
|---|---|---|---|
| 1 | FOMBLIN Z-DEAL | $NH_2(CH_2)_3Si(OEt)_3$ | $XCF_2O(CF_2O)m(C_2F_4O)_pCF_2X$<br>$X = CONH(CH_2)_3Si(OR)_3$<br>R = Me, Et; <m> = 10.2, <p> = 9.6 |
| 2 | FOMBLIN Z-DEAL | $NH_2(CH_2)_3Si(OMe)_3$ | $XCF_2O(CF_2O)_m(C_2F_4O)_pCF_2X$<br>$X = CONH(CH_2)_3Si(OMe)_3$<br><m> = 10.2, <p> = 9.6 |
| 3 | KRYTOX 157 FS(L) methyl ester | $NH_2(CH_2)_3Si(OMe)_3$ | $C_3F_7O(CF(CF_3)CF_2O)_pCF(CF_3)X$<br>$X = CONH(CH_2)_3Si(OMe)_3$<br><p> ≈ 10 |
| 4 | KRYTOX Difunctional | $NH_2(CH_2)_3SiMe(OEt)_2$ | $XCF(CF_3)O(CF(CF_3)CF_2O)_pCF(CF_3)X$<br>$X = CONH(CH_2)_3SiMe(OR)_2$<br>R = Me, Et; <p> ≈ 10 |
| 5 | F-PEO<br>MW 1800, 78% functional | $NH_2(CH_2)_3Si(OEt)_3$ | $XCF_2O(C_2F_4O)_pCF_2X$<br>$X = CONH(CH_2)_3Si(OR)_3$, $OCF_3$<br>R = Me, Et; <p> ≈ 13 |
| 6 | F-MPEG<br>MW 1491 | $NH_2(CH_2)_3Si(OMe)_3$ | $CF_3O(C_2F_4O)_pCF_2X$<br>$X = CONH(CH_2)_3Si(OMe)_3$<br><p> ≈ 11 |

Examples 7–14 and Comparative Examples A–G

The compounds shown in Table 2 were used to prepare 0.25 wt % solutions in methyl perfluorobutyl ether. Using the coating method described in Examples 1–6 above, each of these solutions was coated on a substrate as described above. The coated samples were placed in a forced-air oven at 120° C. for 2 minutes, then removed from the oven and allowed to stand in ambient conditions for 2 days. The samples were tested with SHARPIE black permanent marker ink/dry wipe challenge cycles as described above. Results from this testing are shown in Table 3.

with molecular weights greater than about 1000 (for instance, Examples 7, 11, 13, 14) relative to non-alkoxysilane-functional prior art materials (Comparative Examples B and D) and functional fluorochemicals with

TABLE 2

| Example | Perfluoropolyether Ester | Alkoxysilane | Product |
|---|---|---|---|
| 7 | FOMBLIN Z-DEAL | $NH_2(CH_2)_3SiMe(OEt)_2$ | $XCF_2O(CF_2O)_m(C_2F_4O)_pCF_2X$<br>$X = CONH(CH_2)_3SiMe(OR)_2$<br>$R = Me, Et;  = 10.2,  = 9.6$ |
| 8 | F-PTMO<br>MW 1310, 80% functional | $NH_2(CH_2)_3SiMe(OEt)_2$ | $X(CF_2)_3O(C_4F_8O)_p(CF_2)_3X$<br>$X = CONH(CH_2)_3SiMe(OR)_2, OC_3F_7$<br>$R = Me, Et;  \approx 4$ |
| 9 | F-PTMO<br>MW 2200, 84% functional | $NH_2(CH_2)_3SiMe(OEt)_2$ | $X(CF_2)_3O(C_4F_8O)_p(CF_2)_3X$<br>$X = CONH(CH_2)_3SiMe(OR)_2, OC_3F_7$<br>$R = Me, Et;  \approx 8$ |
| 10 | F-PEO<br>MW 1125, 82% functional | $NH_2(CH_2)_3SiMe(OEt)_2$ | $XCF_2O(C_2F_4O)_pCF_2X$<br>$X = CONH(CH_2)_3SiMe(OR)_2, OCF_3$<br>$R = Me, Et;  \approx 8$ |
| 11 | F-PEO<br>MW 1800, 78% functional | $NH_2(CH_2)_3SiMe(OEt)_2$ | $XCF_2O(C_2F_4O)_pCF_2X$<br>$X = CONH(CH_2)_3SiMe(OR)_2, OCF_3$<br>$R = Me, Et;  \approx 13$ |
| 12 | F-PTMO<br>MW 2200, 84% functional | $NH_2(CH_2)_3Si(OEt)_3$ | $X(CF_2)_3O(C_4F_8O)_p(CF_2)_3X$<br>$X = CONH(CH_2)_3Si(OR)_3, OC_3F_7$<br>$R = Me, Et;  \approx 8$ |
| Comp. Ex. A | F-PTMO<br>MW 646, 98% functional | $NH_2(CH_2)_3Si(OEt)_3$ | $X(CF_2)_3O(C_4F_8O)_p(CF_2)_3X$<br>$X = CONH(CH_2)_3Si(OR)_3, OC_3F_7$<br>$R = Me, Et;  \approx 1$ |
| Comp. Ex. B | FOMBLIN Z-DEAL | None | $XCF_2O(CF_2O)_m(C_2F_4O)_pCF_2$<br>$X = CO_2CH_3$<br>$ = 10.2,  = 9.6$ |
| Comp. Ex. C | — | — | $C_7F_{15}CONHCH_2CH_2CH_2Si(OCH_3)_3$ |
| 13 | KRYTOX 157 FS(L) methyl ester | $NH_2(CH_2)_3Si(Ome)_3$ | $C_3F_7O(CF(CF_3)CF_2O)_pCF(CF_3)X$<br>$X = CONH(CH_2)_3Si(OMe)_3$<br>$ \approx 10$ |
| Comp. Ex. D | — | — | KRYTOX 157 FS(L) Carboxylic Acid |
| 14 | F-MPBG<br>MW 1030 | $NH_2(CH_2)_3Si(Ome)_3$ | $CF_3O(C_2F_4O)_pCF_2X$<br>$X = CONH(CH_2)_3Si(OMe)_3$<br>$ \approx 7$ |
| Comp. Ex.E | — | — | $C_2F_5OC_2F_4OCF_2X$<br>$X = CONH(CH_2)_3Si(OCH_3)_3$ |
| Comp. Ex. F | $CF_3O(C_2F_4O)_2CF_2X$<br>$X = CO_2CH_3$ | $NH_2(CH_2)_3SiMe(OEt)_2$ | $CF_3O(C_2F_4O)2CF_2X$<br>$X = CONH(CH_2)_3SiMe(OR)_2$<br>$R = Me, Et$ |
| Comp. Ex. G | — | — | $C_7F_{15}CH_2OCH_2CH_2CH_2Si(OC_2H_5)_3$ |

TABLE 3

| Example | Results from Ink Test |
|---|---|
| 7 | Beaded after 5 cycles |
| 8 | Beaded after 5 cycles |
| 9 | Beaded after 5 cycles |
| 10 | Beading on cycle 1; no beading by cycle 5 but ink still removable |
| 11 | Beaded after 5 cycles |
| 12 | Partial beading, but ink removable through 5 cycles |
| Comp. Ex. A | No beading on cycle 1; ink not removable after cycle 1 |
| Comp. Ex. B | Beaded on cycles 1 and 2; ink removable through cycle 3 but not by cycle 5 |
| Comp. Ex. C | No beading on cycle 1; ink not removable by cycle 3 |
| 13 | Beaded after 5 cycles |
| Comp. Ex. D | Beaded on cycle 1; cycle 5 showed no ink beading, ink not removable |
| 14 | Beaded after 5 cycles |
| Comp. Ex. E | No ink beading on cycle 1, ink not removable by cycle 4 |
| Comp. Ex. F | No ink beading on cycle 1, ink not removable after cycle 1 |
| Comp. Ex. G | No ink beading on cycle 1, ink not removable after cycle 1 |

The test data in Table 3 show clearly the performance advantages of alkkoxysilane-functional perfluoropolyethers molecular weights of less than about 1000 Comparative Examples C, E, F, and G).

Examples 15–28 and Comparative Examples H–J

The compounds shown in Table 4 were used to prepare 0.1 wt % and 0.25 wt % solutions in methyl perfluorobutyl ether. Using the coating method described in Examples 1–6 above, each of these solutions was coated on a substrate as described above. The coated samples were placed in a forced-air oven at 120° C. for 2 minutes, then removed from the oven and allowed to stand in ambient conditions for 5 days. The samples were then subjected to 10, 100, or 1000 dry rubs (5, 50, and 500 abrasion cycles, respectively) as described above, then the abraded areas were tested by application of SHARPIE black permanent marker ink as described above. Ink beading behavior and ease of removal by dry wipe were noted. Also, reflectance measurements were made on unabraded areas of the samples, along with an uncoated control. Results from this testing are shown in Table 5.

TABLE 4

| Example | Perfluoropolyether Ester | Alkoxysilane | Product |
|---------|--------------------------|--------------|---------|
| 15, 16 | FOMBLIN Z-DEAL | $NH_2(CH_2)_3Si(OMe)_3$ | $XCF_2O(CF_2O)_m(C_2F_4O)_pCF_2X$<br>$X = CONH(CH_2)_3Si(OMe)_3$<br>$<m> = 10.2, <p> = 9.6$ |
| 17, 18 | FOMBLIN Z-DEAL | $NH_2(CH_2)_3SiMe(OEt)_2$ | $XCF_2O(CF_2O)_m(C_2F_4O)_pCF_2X$<br>$X = CONH(CH_2)_3SiMe(OR)_2$<br>$R = Me, Et; <m> = 10.2, <p> = 9.6$ |
| 19, 20 | KRYTOX 157 FS(L) methyl ester | $NH_2(CH_2)_3Si(OMe)_3$ | $C_3F_7O(CF(CF_3)CF_2O)_pCF(CF_3)X$<br>$X = CONH(CH_2)_3Si(OMe)_3$<br>$<p> \approx 10$ |
| 21, 22 | KRYTOX 157 FS(L) methyl ester | $NH_2(CH_2)_3SiMe(OEt)_2$ | $C_3F_7O(CF(CF_3)CF_2O)_pCF(CF_3)X$<br>$X = CONH(CH_2)_3SiMe(OR)_2$<br>$R = Me, Et; <p> \approx 10$ |
| 23, 24 | F-MPEG MW 1673 | $NH_2(CH_2)_3Si(OMe)_3$ | $CF_3O(C_2F_4O)_pCF_2X$<br>$X = CONH(CH_2)_3Si(OMe)_3$<br>$<p> \approx 13$ |
| 25, 26 | F-MPEG MW 1491 | $NH_2(CH_2)_3Si(OMe)_3$ | $CF_3O(C_2F_4O)_pCF_2X$<br>$X = CONH(CH_2)_3Si(OMe)_3$<br>$<p> \approx 11$ |
| 27, 28 | F-MPEG MW 1030 | $NH_2(CH_2)_3Si(OMe)_3$ | $CF_3O(C_2F_4O)_pCF_2X$<br>$X = CONH(CH_2)_3Si(OMe)_3$<br>$<p> \approx 7$ |
| Comp. Ex. H | FOMBLIN Z-DEAL | None | $XCF_2O(CF_2O)_p(C_2F_4O)_pCF_2$<br>$X = CO_2CH_3$<br>$<m> = 10.2, <p> = 9.6$ |
| Comp. Ex. I | — | — | KRYTOX 157 FS(L) Carboxylic Acid |
| Comp. Ex. J | — | — | $C_7F_{15}CH_2OCH_2CH_2CH_2SiCl_3$ |

TABLE 5

| Example | Silane Conc. (wt. %) | Reflectance (%) | Dry Rub/Ink Test Results[a] | | |
|---------|----------------------|-----------------|-------|--------|---------|
| | | | 10 DR | 100 DR | 1000 DR |
| 15 | 0.1 | 0.58 | — | — | A |
| 16 | 0.25 | 0.59 | — | — | A |
| 17 | 0.1 | 0.54 | — | B | C |
| 18 | 0.25 | 0.69 | — | — | A |
| 19 | 0.1 | 0.52 | — | B | B |
| 20 | 0.25 | 0.59 | — | — | A |
| 21 | 0.1 | 0.64 | A | A | B |
| 22 | 0.25 | 0.80 | — | A | B |
| 23 | 0.1 | 0.55 | — | — | A |
| 24 | 0.25 | 0.53 | — | — | A |
| 25 | 0.1 | 0.52 | A | C | C |
| 26 | 0.25 | 0.54 | — | — | A |
| 27 | 0.1 | 0.52 | B | D | D |
| 28 | 0.25 | 0.54 | — | B | B |
| Comp. Ex. H | 0.1 | — | E | — | — |
| Comp. Ex. I | 0.1 | — | E | — | — |
| Comp. Ex. J | 0.1 | — | E | — | — |
| Comp. Ex. K | None | 0.57 | E | — | — |

[a] A = Ink beaded, easily removed by dry wipe (Pass).
B = Ink showed partial beading, easily removed by dry wipe (Pass).
C = No ink beading, removed by dry wine (Borderline Pass).
D = No ink beading, removable with difficulty by dry wipe (Borderline Pass).
E = No ink beading, not completely removed by dry wipe (Fail).

Example 29

The perfluloropolyether alkoxysilane from Example 1 was used to prepare a 1 wt % solution in methyl perfluorobutyl ether. Coupons of CDAR/CFL/CDAR antireflective glass (obtained from Viratec Thin Films, Inc., Faribault, Minn.) were degreased by immersion in an ultrasound bath charged with 1:1 (volume/volume) etlhanol:clhloroform, then final cleaning was achieved by exposure to air plasma for 10 minutes in a Harrick PDC-3XG plasma cleaner/sterilizer (Harrick Scientific Corp., Ossining, N.Y.). The coupons were dipped for either a few seconds or 3.5 minutes in the coating solution. After removal, the samples were rinsed by soaking for a few seconds in fresh methyl perfluorobutyl ether containing no perflluoropolyether alkoxysilane. Excess solvent was allowed to evaporate, leaving extremely uniform surfaces showing no visible change in antireflectivity upon inspection and comparison with a sample of the untreated substrate.

The samples were tested for altisoilinig performance by application of black permanent ink from a SIIARPIE marker. The ink beaded into small discrete droplets which could be easily wiped away with a dry KIMWIPE tissue. This test was repeated a total of 15 cycles with no deterioration of the ink beading behavior.

Example 30

A sample of FOMBLIN Z-DEAL was vacuum stripped at 90° C. at 0.02 mm Hg to remove low-boiling fractions and increase the number average molecular weight. A 10.00 g sample of the distillation residue was treated with 1.41 g, of 3-aminopropyltriethoxysilane, and the mixture was agitated and allowed to stand overnight at room temperature. Infrared analysis showed the reaction to be complete, with less than 0.5% ester carbonyl remaining. This gave a titrimetric equivalent weight of 1567 for the perfluoropolyether ester, or a molecular weight of approximately 3134. Portions of the product were diluted to 0.1 wt % or 0.25 wt % in methyl perfluorobutyl etlher. Using the coating method described in Examples 1–6 above, each of these solutions was coated on a substrate as described above. The coated samples were placed in a forced-air oven at 120° C. for 2 minutes, then removed from the oven and allowed to stand in ambient conditions for 7 days. The samples were then subjected to 1000 dry rubs as described above, then the abraded areas were tested by application of SHARPIE black permanent marker ink as described above. Both samples gave excellent ink beading into small discrete droplets which could be easily wiped away with a dry KIMWIPE tissue. Measurements of integrated average reflectance (as determined by the Reflectance Measurements method above) at 450–650 nm gave 0.54% for the antisoiling composition at 0.1 wt % and 0.56% for the antisoiling composition at 0.25 wt % as compared to 0.54% for a substrate not coated with an antisoiling composition.

Example 31

KRYTOX 157 FS(M) perfluoropolyether carboxylic acid (molecular weight approximately 4600, obtained from DuPont Co., Wilmington, Del.) was converted to its acid chloride by heating 25 g of acid at 80° C. with 5 g of phosphorus pentachloride for 1 hour, then stripping at aspirator pressure, extraction of the residue with 30 ml FLUORINERT FC-72 (obtained from 3M Chemicals, 3M Company, St. Paul, Minn.), filtration, and removal of solvent using a rotary evaporator. A three-necked round-bottom flask equipped with magnetic stirring, addition fuinnel, and nitrogen blanket was charged with 14.59 g of this product. With stirring, a solution of 0.64 g of triethylamine in 10 ml of 1,1,2-trichlorotrifluoroethane was added dropwise. The mixture became cloudy immediately. Then, a solution of 0.70 g of 3-aminopropyltriethoxysilane in 10 ml of 1,1,2-trichlorotrifluoroethane was added dropwise with stirring. Infrared analysis of a sample taken 15 minutes after completion of addition, which was blown down under nitrogen, showed complete conversion to amide. Filtration and removal of solvent using a rotary evaporator left 14.49 g of perfluoropolyether alkoxysilane.

A sample that had been prepared using the above procedure and stored in a closed container at room temperature for about 11 years was used to prepare a 0.1 wt % solution and a 0.25 wt % solution, each in methyl perfluorobutyl ether. Using the coating method described in Examples 1–6 above, each of these solutions was coated on a substrate as described above. The coated samples were placed in a forced-air oven at 120° C. for 2 minutes. When tested shortly after preparation, the samples did not cause beading of SHARPIE black permanent marker ink, although the ink could be removed by dry wiping. One week later, the samples were subjected to 1000 dry rubs (using the method described above) and retested. Both showed partial beading of the ink and easy removal by dry wiping in unabraded as well as abraded areas, with slightly better performance in the latter. After another week, the samples were retested and showed excellent ink beading and easy dry wipe removal over unabraded as well as abraded areas. Measurements of integrated average reflectance (as determined by the Reflectance Measurements method above) at 450–650 nm gave 0.57% for the antisoiling composition at 0.1 wt % and 0.57% for the antisoiling composition at 0.25 wt % as compared to 0.54% for a substrate not coated with an antisoiling composition.

Examples 32–36 and Comparative Example L

Solutions of the perfluoropolyether trialkoxysilane of Example 2 above were prepared in methyl perfluorobutyl ether at concentrations of 0.025 wt %, 0.05 wt %, 0.1 wt %, and 0.2 wt %. Each of these solutions was coated on a 20.3 cm wide section of substrate as described above using a gravure roll designated G8 that was capable of applying 0.28 mil (7.1 microns) of wet film onto the web. A wet coating thickness of 0.28 mil (7.1 microns) translated to a dry coating thickness of approximately 17, 34, 68, 136 Angstroms when the solution of the antisoiling composition was at 0.025 wt %, 0.05 wt %, 0.1 wt %, and 0.2 wt %, respectively. The concentrations and coating parameters used for Examples 32–36 are shown in Table 6 below. Comparative Example L was the antireflective substrate described above without an antisoiling coating.

TABLE 6

| Example | Antisoiling Composition (wt %) | Web Speed (meters/minute) | Oven Temperature (° C.) | Pump Rate (cm³/minute) |
|---|---|---|---|---|
| 32 | 0.025 | 3.05 | 106 | 10 |
| 33 | 0.025 | 7.62 | 149 | 25 |
| 34 | 0.05 | 7.62 | 149 | 10 |
| 35 | 0.1 | 7.62 | 149 | 10 |
| 36 | 0.2 | 3.05 | 149 | 10 |

Immediately after the samples were coated they were tested for ink beading as described above. The results are shown in Table 7 below.

TABLE 7

| Example | Ink Test | Durability, 1000 Dry rubs with 2 Kg force (after 7 days under ambient conditions) | Durability, 1000 Dry rubs with 2 Kg force (after 29 days storage under ambient conditions followed by exposure to 65° C., 95% R.H. for 48 hours) | % Average Reflection (450–650 nm) |
|---|---|---|---|---|
| 32 | Ink beading observed after 72 hours | Borderline Pass | Pass | 0.626 |
| 33 | Ink beading observed after 48 hours | Fail | Pass | 0.678 |
| 34 | Ink beading observed after 48 hours | Pass | Pass | 0.658 |
| 35 | Ink beading observed after 48 hours | Pass | Pass | 0.729 |
| 36 | Ink beading observed after 48 hours | Pass | Pass | 0.918 |
| Comp. Ex.L | NO ink beading | | | 0.592 |

Examples 32–36 did not exhibit ink beading behavior when tested immediately after coating with the antisoiling composition, as compared to Examples 1–6. It is believed that this difference is seen because thicker coatings of the antisoiling composition were formed in Examples 1–6, which were coated by hand, versus thinner coating thicknesses in Examples 32–36, which were coated using automated manufacturing equipment. However, after a minimal induction period of at least about 48 hours (from the time when the coating was applied), Examples 32–36 exhibited excellent ink beading behavior. It is believed that this induction period is needed to attain a higher crosslinking density of the antisoiling composition after application on the substrate. It was found that, in order to improve ink beading behavior, the antisoiling coated substrate can either be stored under ambient conditions or at higher temperatures, but not exceeding 70° C.

Example 33 demonstrated that a higher temperature (i.e., a temperature of 149° C. versus 106° C.) appeared to contribute to a faster cure of the antisoiling composition. This was observed by the development of ink beading behavior of Example 33 after 48 hours versus 72 hours for Example 32.

In addition, there was no visual difference in coating uniformity when the antisoiling composition was coated at faster web speeds as shown by Examples 32 and 36 coated at 3 meters/minute versus Examples 33–35 coated at 7.6 meters/minute, although a decrease in durability was observed for Example 33. Durability was apparently increased by allowing the antisoiling coated substrates to undergo a longer exposure time in the oven. Table 7 shows that after 29 days of ambient storage conditions (i.e., room temperature, pressure, and humidity), followed by exposure to 65° C., 95% relative humidity (R.H.) for 48 hours, Examples 32–35 have apparently reached enough level of cure (i.e., crosslinking density) to exhibit the same high level of durability.

The antireflection properties of Examples 32–36 and Comparative Example L were measured using the Reflectance Measurement method described above. The data, as shown in Table 7, demonstrates that lower concentrations of the antisoiling composition obtained lower integrated average percent reflection (over the range of 450–650 nm). Substrates containing an antisoiling composition concentration of less than 0.1% exhibited an increase up to 0.086 unit in average percent reflection, as shown by Examples 32–34. Substrates containing an antisoiling composition concentration of less than 0.2% exhibited an increase of 0.137 unit in average percent reflection, as shown by Example 35. Substrates containing an antisoiling composition concentration of 0.2% exhibited an increase of 0.326 unit in average percent reflection, as shown by Example 36.

Examples 37–41 and Comparative Example M

The antisoiling composition was the same as the perfluoropolyether trialkoxysilane used in Example 1 (the perfluoropolyether trialkoxysilane used in Examples 37–41 had a different terminal group than the perfluoropolyether trialkoxysilane used in Examples 32–36). The antisoiling composition was used at concentrations of 0.025 wt % in methyl perfluorobutyl ether and 0.1 wt % in methyl perfluorobutyl ether. Each of these compositions was coated as described in the Antisoiling Composition Coating Method above onto an antireflective substrate as described above. Examples 37–41 were coated using the same gravure roll described in Examples 32–36. Table 8, below, describes the coating conditions.

TABLE 8

| Example | Antisoiling Composition (wt %) | Web Speed (m/minute) | Oven Temperature (° C.) | Pump Rate (cm³/minute) |
|---|---|---|---|---|
| 37 | 0.025 | 7.62 | 149 | 10 |
| 38 | 0.1 | 3.05 | 149 | 10 |
| 39 | 0.1 | 3.05 | 149 | 15 |
| 40 | 0.1 | 3.05 | 149 | 10 |
| 41 | 0.1 | 3.05 | 149 | 10 |

Immediately after the samples were coated they were tested for ink beading using the Ink Test method described above. The results are shown in Table 9 below. Comparative Example M was the antireflective substrate described above without an antisoiling coating.

TABLE 9

| Example | Ink Test | Durability, 1000 Dry rubs with 2 Kg force (after 7 days storage under ambient conditions) | Durability, 1000 Dry rubs with 2 Kg force (after 29 days storage under ambient conditions followed by exposure to 65° C., 95% R.H. for 48 hours) | % Average Reflection (450–650 nm) |
|---|---|---|---|---|
| 37 | Ink beading observed after 48 hours | Borderline Pass | Borderline Pass | 0.699 |
| 38 | Ink beading observed after 48 hours | Pass | Pass | 0.708 |
| 39 | Ink beading observed after 48 hours | Pass | Pass | 0.708 |
| 40 | Ink beading observed after 48 hours | Pass | Pass | 0.777 |
| 41 | Ink beading observed after 48 hours | Pass | Pass | 0.849 |
| Comp. Ex. M | NO ink beading | | | 0.592 |

Examples 37–41 did not exhibit ink beading behavior when tested immediately after coating with the antisoiling composition. However, after a minimal induction period of at least about 48 hours (from the time when the coating was applied), Examples 37–41 exhibited excellent ink beading behavior. It is believed that this induction period is needed to attain a higher crosslinking density of the antisoiling composition after application on the substrate. The ink beading behavior observed in Examples 37–41 was equivalent to that observed in Examples 32–36, indicating that the difference in the alkoxy group of the silane functionality (—OMe in Examples 32–36 and —OEt in Examples 37–41) did not have an impact.

The data in Table 9 shows that after 29 days of ambient storage conditions, followed by exposure to 65° C., 95% R.H. for 48 hours, Examples 37 and 38 exhibited the same high level of durability.

The antireflection properties of Examples 37–41 and Comparative Example M were determined using the Reflectance Measurement method described above. The data shown in Table 9 indicates that lower concentrations of the antisoiling composition having an ethoxysilane group can still obtain lower average % reflection. Substrates containing an antisoiling composition concentration of less than 0.1% exhibited an increase of 0.1 unit in average percent reflection, as shown in Example 37. Substrates containing an antisoiling composition concentration of 0.1% exhibited an increase up to 0.257 unit in average percent reflection, as shown in Examples 38–41.

Example 42

The effect of thickness of antisoiling coating is shown in Example 42. A solution of 0.025 wt % perfluoropolyether trialkoxysilane from Example 32 was applied to a substrate as described above using the Coating Method, also described above, wherein the gravure roll (designated G4) used to coat Example 42 is capable of applying 0.17 mil (4.3 microns) of wet coating solution. A wet coating thickness of 0.17 mil (4.3 microns) is approximately a dry coating thickness of 10.8 Angstroms when the concentration of the antisoiling composition is at 0.025 wt %. The process conditions are shown in Table 10. It was observed that Example 42 did not have ink beading behavior, even after an induction period of 29 days at room temperature followed by a 48 hours exposure to 65° C., 95% relative humidity. When comparing the theoretical dry thickness of Example 42 of about 11 Angstroms to the theoretical dry thickness of Example 32 of about 17 Angstroms, the latter yielded better ink beading behavior as described in Table 7.

TABLE 10

| Example | Antisoiling Composition (wt %) | Web Speed (meters/minute) | Oven Temperature (° C.) | Pump Rate (cm³/minute) |
|---|---|---|---|---|
| 42 | 0.025 with G4 | 3.05 | 149 | 10 |
| 32 | 0.025 with G8 | 3.05 | 106 | 25 |

Examples 43–48 and Comparative Example N

The antisoiling composition of Example 2 was used to prepare 0.1 wt % and 0.2 wt % solutions in methyl perfluorobutyl ether. Two different catalysts were added to each formlulation. Examples 43 and 45 included dibutyl tin diacetate catalyst (commercially available from Aldrich Chemical Co., Milwaukee, Wis., abbreviated "DTB" herein) added at a level of 4.0 wt % based on the amount of perfluoropolyether alkoxysilane described in Example 2 as a 1 wt % solution in methyl perfluorobutyl ether. Examples 44 and 46 included a dibutyltin bis-acetylacetonate catalyst (commercially available under the trade designation NEO-STANN U220, from Kaneka America Corporation, N.Y., N.Y., abbreviated "NST" herein) at a level of 4.0 wt % in methyl perfluorobutyl ether based on the amount of perfluoropolyetlher alkoxysilane. Examples 47 and 48 did not include a catalyst. Examples 43–48 were coated as described in the Coating Method above using a gravure roll designated G4. Coating parameters and component concentrations are outlined in Table 11.

TABLE 11

| Example | Catalyst (wt %) | Antisoiling Composition (wt %) | Web Speed (m/minute) | Oven Temp. (° C.) | Pump Rate (cm³/ minute) |
|---|---|---|---|---|---|
| 43 | 4.0 (DBT) | 0.1 | 7.62 | 149 | 7 |
| 44 | 4.0 (NST) | 0.1 | 7.62 | 149 | 7 |

TABLE 11-continued

| Example | Catalyst (wt %) | Antisoiling Composition (wt %) | Web Speed (m/minute) | Oven Temp. (° C.) | Pump Rate (cm³/ minute) |
|---|---|---|---|---|---|
| 45 | 4.0 (DBT) | 0.2 | 7.62 | 149 | 7 |
| 46 | 4.0 (NST) | 0.2 | 7.62 | 149 | 7 |
| 47 | 0 | 0.2 | 7.62 | 149 | 7 |
| 48 | 0 | 0.1 | 7.62 | 149 | 7 |

Examples 43–48 were evaluated using the Ink Test and the Reflectance Measurement methods described above. The results are shown in Table 12. Comparative Example N was the antireflective substrate described thout an antisoiling coating.

TABLE 12

| Example | SHARPIE Ink Beading Behavior, after 24 hours storage under ambient conditions | Ease of SHARPIE Ink Removal, after 96 hours storage under ambient conditions | % Average Reflection (450–650 nm) |
|---|---|---|---|
| 43 | Fair ink beading observed | Ink removal with some effort | 0.783 |
| 44 | Fair ink beading observed | Ink removal with minimal effort | 0.733 |
| 45 | Fair ink beading observed | Ink removal with minimal effort | 0.775 |
| 46 | Good ink beading | Good ink removal | 0.885 |
| 47 | Fair ink beading observed | Leaves trace of ink | 0.766 |
| 48 | Fair ink beading observed | Leaves trace of ink | 0.664 |
| Comp. Ex. N | NO ink beading | | 0.592 |

From the observations noted in Table 12, it appears that the addition of a tin catalyst can decrease the time that it takes for a coated substrate to develop antisoiling properties. Examples 44–46 showed better ink removability than did Examples 47–48 which did not contain a catalyst. The reflectivity of Examples 43–46 showed a higher increase upon the addition of a tin catalyst. However, in order to have the least increase in reflectivity, one option may be to omit the addition of a catalyst and provide longer periods of room temperature storage to obtain improved antisoiling performance.

Comparative Examples O and P

A perfluoropolyether carboxylate salt of a long-chain alkyl amine was prepared by mixing in a vial 2 g of KRYTOX 157 FS(L) perfluoropolyether carboxylic acid and 0.27 g of octadecylamine (available from Aldrich Chemical Company, Milwaukee, Wis.). The mixture was warmed with a heat gun to melt the amine, and agitated to mix the reagents. After cooling, the product was an opaque grease. Infrared analysis showed disappearance of the acid carbonyl group and conversion to the ammonium carboxylate salt. This material was used for Comparative Example O.

Ammonia gas was bubbled through 2 g of FOMBLIN Z-DEAL perfluoropolyether diester in a small vial for several minutes at 760 mm Hg and room temperature. Infrared analysis of the liquid product showed complete disappearance of the ester carbonyl band and conversion to the primary amide. This material was used for Comparative Example P.

The above products were used to prepare coating solutions by diluting portions to 0.1 wt % or 0.25 wt % in methyl perfluorobutyl ether. The coating solutions for Comparative Example O were both hazy, whereas those for Comparative Example P were clear. Using a #6 wire-wound rod, each of these solutions was coated as described in Examples 1–6 on a substrate as described above. The coated samples were placed in a forced-air oven at 120° C. for 2 minutes. After removal from the oven and cooling, the samples were allowed to stand in air at room temperature for 2 days. They were then tested by application of SHARPIE black permanent marker ink as described above. None of the samples showed any beading of the applied ink, and the ink could not be completely removed fiom any of the samples by dry wiping. The same results were obtained after subjecting the samples to 10 dry rubs as described above and then testing the abraded areas.

The complete disclosure of all patents, patent documents, and publications cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. An antireflective article comprising a substrate having an antireflective surface and an antisoiling coating that is at least partially cured thereon; wherein the antisoiling coating comprises a fluorinated siloxane prepared by applying a coating composition comprising at least one fluorinated silane having a number average molecular weight of at least about 1000 and the following formula:

wherein: $R_f$ is a monovalent or divalent polyfluoropolyether group; $R^1$ is a substituted divalent alkylene group, arylene group, or combinations thereof, wherein at least one substituent in $R^1$ is selected from the group consisting of heteroatoms and functional groups, and further wherein at least one substituent in $R^1$ is optionally a halogen; $R^2$ is a $C_1$–$C_4$ alkyl group; Y is a halogen, a $C_1$–$C_4$ alkoxy group, or a $C_1$–$C_4$ acyloxy group; x is 0 or 1; and y is 1 or 2.

2. The antireflective article of claim 1 wherein the antireflective surface comprises a metal oxide film havingy one or more metal oxides.

3. The antireflective article of claim 2 wherein the antireflective surface comprises a vacuum deposited metal oxide film.

4. The antireflective article of claim 3 wherein the antisoiling coating is at least about 15 Angstroms thick.

5. The antireflecive article of claim 4 wherein the antisoiling coating is no greater than about 150 Angstroms thick.

6. The antireflective article of claim 1 which has a first surface antireflectivity that is different by less than about 0.5 percentage units from that of the same article without the antisoiling coating.

7. The antireflective article of claim 1 wherein the coating is prepared by applying a coating composition comprising at least one fluorinated silane wherein each Y is a $C_1$–$C_4$ alkoxy group.

8. The antireflective article of claim 1 wherein the coating is prepared by applying a coating composition comprising at least one fluorinated silane wherein $R_f$ is a perfluoropolyether group.

9. The antireflective article of claim 8 wherein the coating is prepared by applying a coating composition comprising at least one fluorinated silane wherein $R_f$ is a perfluoropolyether group comprising perfluorinated repeating units selected from the group consisting of —$(C_nF_{2n})$—, —$(C_nF_{2n}O)$—, —$(CF(Z))$—, —$(CF(Z)O)$—, —$(CF(Z)C_nF_{2n}O)$—, —$(C_nF_{2n}CF(Z)O)$—, —$(CF_2CF(Z)O)$—, and combinations thereof, wherein n is 1 to 4 and Z is a perfluoroalkyl group, a perfluoroetheralkyl group, a perfluoroalkoxy group, or a perfluoroetheralkoxy group, each of which has about 1 to about 9 carbon atoms and 0 to about 4 oxygen atoms.

10. The antireflective article of claim 1 wherein the coating is prepared by applying a coating composition comprising a fluorinated silane selected from the group consisting of $XCF_2O(CF_2O)_m(C_2F_4O)_pCF_2X$, $C_3F_7O(CF(CF_3)CF_2O)_pCF(CF_3)X$, $XCF(CF_3)O(CF(CF_3)CF_2O)_pCF(CF_3)X$, $XCF_2O(C_2F_4O)_pCF_2X$, $CF_3O(C_2F_4O)_pCF_2X$, $X(CF_2)_3O(C_4F_8O)_p(CF_2)_3X$, and mixtures thereof, wherein:

—X is —$R^1$—$SiY_{3-x}R^2_x$ as defined in claim 1 or a terminal group selected from the group consisting of $(C_nF_{2n+1})$—, $(C_nF_{2n+1}O)$—, $(X'C_nF_{2n}O)$—, and $(X'C_nF_{2n})$—, wherein X' is H, Cl, or Br, with the proviso that at least one X group per molecule is a silane, and n is 1 or more;

an average value of m is within a range of about 1 to about 50; and an average value of p is within a range of about 4 to about 40.

11. The antireflective article of claim 1 wherein the antisoiling coating composition further includes an alkyl perfluoroalkyl ether.

12. The antireflective article of claim 1 wherein $R^1$ includes about 2 to about 16 carbon atoms.

13. The antireflective article of claim 1 wherein the antisoiling coating composition further comprises a solvent.

14. An antisoiling coating composition comprising at least one fluorinated silane having a number average molecular weight of at least about 1000 and an alkyl perfluoroalkyl ether, wherein the fluorinated silane has the following formula:

wherein: $R_f$ is a monovalent or divalent polyfluoropolyether group; $R^1$ is a substituted or unsubstituted divalent alkylene group, arylene group, or combinations thereof, wherein at least one substituent if present is selected from the group consisting of heteroatoms, functional groups, and halogens; $R^2$ is a $C_1$–$C_4$ alkyl group; Y is a halogen, a $C_1$–$C_4$ alkoxy group, or a $C_1$–$C_4$ acyloxy group; x is 0 or 1; and y is 1 or 2.

15. The antisoiling composition of claim 14 wherein $R_f$ has an approximate average structure selected from the group consisting of —$CF_2O(CF_2O)_m(C_2F_4O)_pCF_2$—, $C_3F_7O(CF(CF_3)CF_2O)_pCF(CF_3)$—, $CF_3O(C_2F_4O)_pCF_2$—, —$CF(CF_3)O(CF(CF_3)CF_2O)_pCF(CF_3)$—, —$CF_2O(C_2F_4O)_p CF_2$—, and —$(CF_2)_3O(C_4F_8O)_p(CF_2)_3$—, wherein m has an average value of 0 to about 50, and p has an average value of 0 to about 50, with the proviso that both m and p cannot be 0 in the same group.

16. A method of applying an antisoiling coating to a substrate having an antireflective surface, the method comprising treating the antireflective surface with a coating composition comprising at least one fluorinated silane having a number average molecular weight of at least about 1000 and the following formula:

wherein: $R_f$ is a monovalent or divalent polyfluoropolyether group; $R^1$ is a substituted divalent alkylene group, arylene group, or combinations thereof, wherein at least one substituent in $R^1$ is selected from the group consisting of heteroatoms and functional groups, and further wherein at least one substituent in $R^1$ is optionally a halogen; $R^2$ is a $C_1$–$C_4$ alkyl group; Y is a halogen, a $C_1$–$C_4$ alkoxy group, or a $C_1$–$C_4$ acyloxy group; x is 0 or 1; and y is 1 or 2.

17. The method of claim 16 wherein the coating composition further comprises a nonchlorinated solvent selected from the group consisting of a fluorinated alkane, an alkyl perfluoroalkyl ether, and mixtures thereof.

18. The method of claim 16 wherein the coating is prepared by applying a coating composition comprising a fluorinated silane selected from the group consisting of $XCF_2O(CF_2O)_m(C_2F_4O)_pCF_2X$, $C_3F_7O(CF(CF_3)CF_2O)_p CF(CF_3)X$, $XCF(CF_3)O(CF(CF_3)CF_2O)_pCF(CF_3)X$, $XCF_2O(C_2F_4O)_pCF_2X$, $CF_3O(C_2F_4O)_pCF_2X$, $X(CF_2)_3O(C_4F_8O)_p(CF_2)_3X$, and mixtures thereof, wherein:
—X is —$R_1$—$SiY_{3-x}R^2_x$ as defined above in claim 15 or a terminal group selected from the group consisting of $(C_nF_{2n+1})$—, $(C_nF_{2n+1}O)$—, $(X'C_nF_{2n})$—, and $(X'C_nF_{2n})$—, wherein X' is H, Cl, or Br, with the proviso that at least one X group per molecule is a silane, and n is 1 or more;
an average value of m is within a range of about 1 to about 50; and
an average value of p is within a range of about 4 to about 40.

19. The method of claim 16 wherein the antisoiling coating formed is at least about 15 Angstroms thick.

20. The method of claim 19 wherein the antisoiling coating formed is no greater than about 150 Angstroms thick.

21. The method of claim 16 wherein the step of treating comprises coating the composition at room temperature followed by heating the coated composition at a temperature of at least about 100° C.

22. The method of claim 16 wherein the coating composition comprising the fluorinated silane comprises less than about 2.0 weight percent of the fluorinated silane.

23. The method of claim 16 wherein the step of treating comprises continuously roll coating the composition onto the substrate.

24. The method of claim 23 wherein the step of roll coating comprises feeding the coating composition to a doctor blade, transferring the coating composition from the doctor blade to a gravure roll, and applying the coating composition to the antireflective surface of the substrate from the gravure roll.

25. The method of claim 24 wherein the step of coating the antisoiling coating composition further comprises applying a soft roll to a surface opposing the antireflective surface of the transparent substrate.

26. The method of claim 23 wherein the antisoiling coating composition further comprises a nonchlorinated solvent.

27. The method of claim 26 wherein the solvent is selected from the group consisting of a fluorinated alkane, an alkyl perfluoroalkyl ether, and mixtures thereof.

28. The method of claim 27 wherein the solvent is an alkyl perfluoroalkyl ether.

29. An antireflective article made by the method of claim 23.

30. The method of claim 16 wherein the antisoiling coating composition further comprising a solvent.

31. An antireflective article comprising:
a transparent substrate having a first surface and a second surface;
an antireflective coating on at least a portion of the first surface; and
an antisoiling coating disposed on the antireflective coating, wherein the antisoiling coating comprises siloxane groups and polyfluoropolyether segments covalently bonded to silicon via organic linking groups, wherein the polyfluoropolyether segments have a molecular weight of at least about 1000 and the organic linking groups include nitrogen atoms.

32. The antireflective article of claim 31 wherein the antisoiling coating has a fluorine atom to nitrogen atom ratio of about 25 to about 150.

33. The antireflective article of claim 31 wherein the antisoiling coating comprises a fluorinated siloxane prepared by applying a coating composition comprising at least one fluorinated silane having a number average molecular weight of at least about 1000 and the following formula:

wherein: $R_f$ is a monovalent or divalent polyfluoropolyether group; $R^1$ is a nitrogen-substituted divalent alkylene group, arylene group, or combinations thereof, optionally substituted with one or more substituents selected from the group consisting of heteroatoms other than nitrogen, functional groups, and halogens; $R^2$ is a $C_1$–$C_4$ alkyl group; Y is a halogen, a $C_1$–$C_4$ alkoxy group, or a $C_1$–$C_4$ acyloxy group; x is 0 or 1; and y is 1 or 2.

34. The antireflective article of claim 33 wherein the $R^1$ group contains heteroatoms or functional groups and is optionally substituted with halides.

35. The antireflective article of claim 34 wherein $R^1$ is a divalent hydrocarbon containing at least one functional group.

36. The antireflective article of claim 31 wherein the transparent substrate comprises a flexible organic polymeric material.

37. The antireflective article of claim 36 further comprising an adhesion-enhancing coating disposed between the flexible organic polymeric substrate and the antireflective coating.

38. The antireflective article of claim 37 wherein the antireflective coating comprises a metal oxide film having one or more metal oxides.

39. The antireflective article of claim 38 wherein the antireflective surface comprises a vacuum deposited metal oxide film.

40. An antireflective article comprising:
a transparent substrate comprising a flexible organic polymetric material having a first surface and a second surface;
an antireflective coating on at least a portion of the first surface;
a layer of a pressure sensitive adhesive disposed on the second surface of the substrate; and
an antisoiling coating on at least a portion of the antireflective coating, wherein the antisoiling coating comprises siloxane groups and polyfluoropolyether segments covalently bonded to silicon via organic linking groups, wherein the polyfuoropolyether segments have a molecular weight of at least about 1000.

41. An antireflective article comprising a substrate having an antireflective surface and an antisoiling coating that is at least partially cured thereon; wherein the antisoiling coating comprises a fluorinated siloxane prepared by applying a coating composition comprising at least one fluorinated silane having a number average molecular weight of at least about 1000 and the following formula:

wherein: $R_f$ is a monovalent or divalent polyfluoropolyether group; $R^1$ is a substituted or unsubstituted divalent alkylene groups, arylene group, or combinations thereof, wherein at least one substituent if present is selected from the group consisting of heteroatoms, functional groups, and halogens; $R^2$ is a $C_1$–$C_4$ alkyl group; Y is a halogen, a $C_1$–$C_4$ alkoxy group, or a $C_1$–$C_4$ acyloxy group; x is 0 or 1; and y is 1 or 2 and further wherein the antisoiling coating composition includes an alkyl perfluoroalkyl ether.

42. An antireflective article comprising a substrate having an antireflective surface and an antisoiling coating that is at least partially cured thereon; wherein the antisoiling coating comprises a fluorinated siloxane prepared by applying a coating composition comprising at least one fluorinated silane having a number average molecular weight of at least about 1000 and the following formula:

wherein: $R_f$ is a divalent polyfluoropolyether group; $R^1$ is a substituted or unsubstituted divalent alkylene group, arylene group, or combinations thereof, wherein at least one substituent if present is selected from the group consisting of heteroatoms, functional groups, and halogens; $R^2$ is a $C_1$–$C_4$ alkyl group; Y is a halogen, a $C_1$–$C_4$ alkoxy group, or a $C_1$–$C_4$ acyloxy group; x is 0 or 1; and y is 2.

43. A method of applying an antisoiling coating to a substrate having an antireflective surface, the method comprising treating the antireflective surface with a coating composition comprising at least one fluorinated silane having a number average molecular weight of at least about 1000 and the following formula:

wherein: $R_f$ is a divalent polyfluoropolyether group; $R^1$ is a substituted or unsubstituted divalent alkylene group, arylene group, or combinations thereof, wherein at least one substituent if present is selected from the group consisting of heteroatoms, functional groups, and halogens; $R^2$ is a $C_1$–$C_4$ alkyl group; Y is a halogen, a $C_1$–$C_4$ alkoxy group, or a $C_1$–$C_4$ acyloxy group; x is 0 or 1; and y is 2.

* * * * *

UNITED STATES PATENT AND TRADEMARK OFFICE
CERTIFICATE OF CORRECTION

PATENT NO.    : 6,277,485 B1
DATED         : August 21, 2001
INVENTOR(S)   : Invie, Judith M.

It is certified that error appears in the above-identified patent and that said Letters Patent is hereby corrected as shown below:

Column 2,
Line 29, "antirefilective" should read -- antireflective --;

Column 4,
Line 29, "(mu)" should read -- (nm) --;
Line 44, "co-etllylacrylate" should read -- co-ethylacrylate --;

Column 5,
Line 18, "I" should read -- 1 --;

Column 6,
Line 24, "emulsiton" should read -- emulsion --;

Column 7,
Line 65, "$-CF_2O(C_2\ F_4O)_pCF_2-$" should read -- $-CF_2O(C_2F_4O)_pCF_2-$ --;

Column 8,
Line 38, "$X'C_nF_{2n+1}O)-$" should read -- $X'C_nF_{2n})$ --;
Line 58, "nonftinctionalized" should read -- nonfunctionalized --;
Line 63, "tecminiques" should read -- techniques --;

Column 9,
Line 34, "includes" should read -- include --;
Line 50, "nonclhlorinated" should read -- nonchlorinated --;

Column 12,
Line 13, "anti reflectivity" should read -- antireflectivity --;
Line 38, "preferably, than about 0.2" should read -- preferably, less than about 0.2 --;

Column 13,
Line 35, "ster" should read -- ester --;
Line 38, "esignation" should read -- designation --;

Column 14,
Line 22, "Fusion UV curing Inc." should read -- Fusion UV Curing Inc. --;

Column 15,
Line 17, "rubbino" should read -- rubbing --;
Line 35, "caiuot" should read -- cannot --;

UNITED STATES PATENT AND TRADEMARK OFFICE
CERTIFICATE OF CORRECTION

PATENT NO. : 6,277,485 B1
DATED : August 21, 2001
INVENTOR(S) : Invie, Judith M.

It is certified that error appears in the above-identified patent and that said Letters Patent is hereby corrected as shown below:

Column 16,
Under Table 1, under the column "Product", "Example 1", 1$^{st}$ line,
"$XCF_2O(CF_2O)m$" should read -- $XCF_2O(CF_2O)_m$ --;

Column 18,
Under Table 2, under the column "Product", "Example 12", 1$^{st}$ line,
"$X(CF_2)_3O(C_4F_8O)(CF_2)_3X$" should read -- $X(CF_2)_3O(C_4F_8O)_p(CF_2)_3X$ --;
Under Table 2, under the column "Product", "Example Comp. Ex. F", 1$^{st}$ line,
"$CF_3O(C_2F_4O)2CF_2X$" should read -- $CF_3O(C_2F_4O)_2CF_2X$ --;
Line 4, "and functional" should read -- and alkoxysilane-functional --;

Column 19,
Line 59, "perfluloropolyether" should read -- perfluoropolyether --;
Line 64, "etlhanol:clhloroform," should read -- ethanol:chloroform, --;

Column 20,
Under Table 4, under the column "Product", "Example Comp. Ex. H", 1$^{st}$ line,
"$XCF_2O(CF_2O)_p(C_2F_4O)_pCF_2$" should read -- $XCF_2O(CF_2O)_m(C_2F_4O)_pCF_2$ --;
Line 33, "perflluoropolyether" should read -- perfluoropolyether --;
Line 38, "altisoilinig" should read -- antisoiling --;
Line 39, "SIIARPIE" should read -- SHARPIE --;

Column 21,
Line 18, "fuinnel" should read -- funnel --;

Column 25,
Line 43, "formlulation" should read -- formulation --;
Lines 53 and 54, "perfluoropolyetlher" should read -- perfluoropolyether --;

Column 26,
Line 16, "described thout an" should read -- described above without an --;

Column 27,
Line 33, "$R_1$" should read -- $R^1$ --;
Line 45, "havingy" should read -- having --;
Line 52, "antireflecive" should read -- antireflective --;

UNITED STATES PATENT AND TRADEMARK OFFICE
CERTIFICATE OF CORRECTION

PATENT NO. : 6,277,485 B1
DATED : August 21, 2001
INVENTOR(S) : Invie, Judith M.

It is certified that error appears in the above-identified patent and that said Letters Patent is hereby corrected as shown below:

Column 28,
Line 40, "$R_1$" should read -- $R^1$ --;
Line 54, "$(C_2F_4O)_p\ CF_2$–" should read -- $(C_2F_4O)_pCF_2$– --;

Column 29,
Line 18, "$R_1$" should read -- $R^1$ --;
Line 18, "claim 15" should read -- claim 16 --; and Column 30,
Line 19, "$R_f$–[–$R^1$–$SiY_{3-x}R^2_x$1322]$_y$" should read -- $R_f$–[–$R^1$–$SiY_{3-x}R^2_x$]$_y$ --.

Signed and Sealed this

Ninth Day of July, 2002

Attest:

JAMES E. ROGAN
Attesting Officer
Director of the United States Patent and Trademark Office

EX PARTE REEXAMINATION CERTIFICATE (5443rd)

United States Patent
Invie et al.

(10) Number: US 6,277,485 C1
(45) Certificate Issued: Jul. 4, 2006

(54) ANTISOILING COATINGS FOR ANTIREFLECTIVE SURFACES AND METHODS OF PREPARATION

(75) Inventors: Judith M. Invie, St. Paul, MN (US); Mark J. Pellerite, Woodbury, MN (US)

(73) Assignee: 3M Innovative Properties Company, St. Paul, MN (US)

Reexamination Request:
No. 90/006,770, Aug. 29, 2003

Reexamination Certificate for:
Patent No.: 6,277,485
Issued: Aug. 21, 2001
Appl. No.: 09/014,341
Filed: Jan. 27, 1998

Certificate of Correction issued Jul. 9, 2002.

(51) Int. Cl.
*B32B 27/30* (2006.01)

(52) U.S. Cl. ............. 428/336; 106/287.13; 106/287.14; 106/287.16; 427/165; 427/166; 427/167; 427/296; 427/387; 427/389.7; 427/393.4; 427/407.2; 427/419.2; 427/419.5; 427/428.06; 427/428.14; 428/412; 428/421; 428/432; 428/447; 428/451; 428/699; 428/701; 428/702

(58) Field of Classification Search ................. None
See application file for complete search history.

(56) References Cited

U.S. PATENT DOCUMENTS

| | | | |
|---|---|---|---|
| 2,803,615 | A | 8/1957 | Ahlbrecht et al. |
| 2,839,513 | A | 6/1958 | Ahlbrecht et al. |
| 2,995,542 | A | 8/1961 | Brown |
| 3,132,117 | A | 5/1964 | Schmidt |
| 3,356,628 | A | 12/1967 | Smith et al. |
| 3,442,664 | A | 5/1969 | Heine |
| 3,492,374 | A | 1/1970 | LeBleu et al. |
| 3,794,672 | A | 2/1974 | Kim |
| 3,798,251 | A | 3/1974 | Meiller |
| 3,809,783 | A | 5/1974 | Pittman et al. |
| 3,810,874 | A | 5/1974 | Mitsch et al. |
| 3,814,741 | A | 6/1974 | Caporiccio et al. |
| 3,859,320 | A | 1/1975 | Atherton |
| 3,950,588 | A | 4/1976 | McDougal |
| 3,992,374 | A | 11/1976 | Rufer et al. |
| 4,046,457 | A | 9/1977 | Land et al. |
| 4,085,137 | A | 4/1978 | Mitsch et al. |
| 4,125,673 | A | 11/1978 | Roth et al. |
| 4,211,823 | A | 7/1980 | Suzuki et al. |
| 4,338,454 | A | 7/1982 | Wesson et al. |
| 4,478,873 | A | 10/1984 | Masso et al. |
| 4,499,146 | A | 2/1985 | Piacenti et al. |
| 4,539,061 | A | 9/1985 | Sagiv |
| 4,687,707 | A | 8/1987 | Matsuo et al. |
| 4,745,009 | A | 5/1988 | Piacenti et al. |
| 4,786,544 | A | 11/1988 | Saito |
| 4,849,305 | A | 7/1989 | Yanagisawa |
| 4,902,585 | A | 2/1990 | Ogawa et al. |
| 4,904,525 | A | 2/1990 | Taniguchi et al. |
| 4,927,950 | A | 5/1990 | Hisamoto et al. |
| 4,940,602 | A | 7/1990 | Taniguchi et al. |
| 4,970,099 | A | 11/1990 | Adams et al. |
| 4,981,727 | A | 1/1991 | Brinduse et al. |
| 4,983,459 | A | 1/1991 | Franz et al. |
| 4,983,666 | A | 1/1991 | Zavatteri et al. |
| 4,990,418 | A | 2/1991 | Mukoh et al. |
| 4,997,684 | A | 3/1991 | Franz et al. |
| 5,015,523 | A | 5/1991 | Kawashima et al. |
| 5,068,135 | A | 11/1991 | Zavatteri et al. |
| 5,071,709 | A | 12/1991 | Berquier et al. |
| 5,081,192 | A | 1/1992 | Tatemoto |
| 5,091,244 | A | 2/1992 | Biornard |
| 5,105,310 | A | 4/1992 | Dickey |
| 5,124,467 | A | 6/1992 | Rodgers et al. |
| 5,139,879 | A | 8/1992 | Aharoni et al. |
| 5,147,125 | A | 9/1992 | Austin |
| 5,150,004 | A | 9/1992 | Tong et al. |
| 5,153,481 | A | 10/1992 | Matsuda et al. |
| 5,194,326 | A | 3/1993 | Arthur et al. |
| 5,248,915 | A | 9/1993 | Tong et al. |
| 5,248,916 | A | 9/1993 | Tong et al. |
| 5,262,557 | A | 11/1993 | Kishita et al. |
| 5,270,858 | A | 12/1993 | Dickey |
| 5,271,806 | A | 12/1993 | Deutsch et al. |
| 5,274,159 | A | 12/1993 | Pellerite et al. |
| 5,281,893 | A | 1/1994 | Matsuda et al. |
| 5,284,707 | A | 2/1994 | Ogawa et al. |
| 5,288,889 | A | 2/1994 | Takago et al. |
| 5,306,758 | A | 4/1994 | Pellerite |
| 5,324,566 | A | 6/1994 | Ogawa et al. |

(Continued)

FOREIGN PATENT DOCUMENTS

| AU | 736 642 | 8/2001 |
| AU | 739 635 | 10/2001 |
| CA | 1324539 | 11/1993 |
| CN | 1170950 A | 1/1998 |
| EP | 0 166 363 A2 | 1/1986 |
| EP | 0 203 730 A2 | 12/1986 |
| EP | 0 278 060 A3 | 8/1988 |
| EP | 0 278 060 A2 | 8/1988 |
| EP | 0 282 188 A1 | 9/1988 |

(Continued)

OTHER PUBLICATIONS

Kondo et al., "Antireflective films and display devices," Chem. Abs. 127: 72776w, p. 52 (1997).

(Continued)

*Primary Examiner*—Margaret G. Moore

(57) ABSTRACT

An antisoiling coating for an antireflective surface, particularly the outer surface of an antireflective film stack, wherein the antisoiling coating includes a fluorinated siloxane, preferably prepared by applying a coating composition of a fluorinated silane, having a number average molecular weight of at least about 1000, of the following formula:

$$R_f\text{—}[\text{—}R^1\text{—}SiY_{3-x}R^2{}_x]_y \qquad (I)$$

wherein: $R_f$ is a monovalent or divalent polyfluoropolyether group; $R^1$ is a divalent alkylene group, arylene group, or combinations thereof, $R^2$ is a lower alkyl group; Y is a halide, a lower alkoxy group, or a lower acyloxy group; x is 0 or 1; and y is 1 or 2.

U.S. PATENT DOCUMENTS

| | | | |
|---|---|---|---|
| 5,328,768 A | 7/1994 | Goodwin |
| 5,338,877 A | 8/1994 | Sawada et al. |
| 5,368,892 A | 11/1994 | Berquier |
| 5,372,874 A | 12/1994 | Dickey et al. |
| 5,382,639 A | 1/1995 | Moore et al. |
| 5,389,427 A | 2/1995 | Berquier |
| 5,407,709 A | 4/1995 | Ogawa et al. |
| 5,407,733 A | 4/1995 | Bjornard et al. |
| 5,437,894 A | 8/1995 | Ogawa et al. |
| 5,446,205 A | 8/1995 | Marchionni et al. |
| 5,450,238 A | 9/1995 | Bjornard et al. |
| 5,514,731 A | 5/1996 | Nakai |
| 5,570,161 A | 10/1996 | Andrews et al. |
| 5,579,162 A | 11/1996 | Bjornard et al. |
| 5,580,819 A | 12/1996 | Li et al. |
| 5,622,784 A | 4/1997 | Okaue et al. |
| 5,688,864 A | 11/1997 | Goodwin |
| 5,744,227 A | 4/1998 | Bright et al. |
| 5,763,061 A | 6/1998 | Ochiai et al. |
| 5,783,299 A | 7/1998 | Miyashita et al. |
| 5,800,918 A | 9/1998 | Chartier et al. |
| 5,851,674 A | 12/1998 | Pellerite et al. |
| 5,922,787 A * | 7/1999 | Kondo et al. ............... 523/122 |
| 5,972,517 A * | 10/1999 | Kondo et al. ............... 428/446 |
| 5,981,059 A * | 11/1999 | Bright et al. ............... 428/336 |
| 5,997,943 A | 12/1999 | Azzopardi et al. |
| 6,013,722 A | 1/2000 | Yang et al. |
| 6,183,872 B1 | 2/2001 | Tanaka et al. |
| 6,221,434 B1 | 4/2001 | Visca et al. |
| 6,243,203 B1 | 6/2001 | Schleipen et al. |

FOREIGN PATENT DOCUMENTS

| | | |
|---|---|---|
| EP | 0 314 413 A2 | 5/1989 |
| EP | 0 327 906 A1 | 8/1989 |
| EP | 0 352 180 A1 | 1/1990 |
| EP | 0 166 363 B1 | 8/1991 |
| EP | 0 282 188 B1 | 11/1991 |
| EP | 0 492 545 A3 | 7/1992 |
| EP | 0 492 545 A2 | 7/1992 |
| EP | 0 327 906 B1 | 8/1992 |
| EP | 0 352 180 B1 | 12/1992 |
| EP | 0 203 730 B1 | 6/1993 |
| EP | 0 545 201 A2 | 6/1993 |
| EP | 0 545 201 A3 | 6/1993 |
| EP | 0 343 526 B1 | 9/1993 |
| EP | 0 564 134 A3 | 10/1993 |
| EP | 0 564 134 A2 | 10/1993 |
| EP | 0 278 060 B1 | 4/1994 |
| EP | 0 687 533 A1 | 12/1995 |
| EP | 0 719 821 A1 | 7/1996 |
| EP | 0 738 771 A1 | 10/1996 |
| EP | 0 745 568 A1 | 12/1996 |
| EP | 0 749 021 A3 | 12/1996 |
| EP | 0749021 A2 | 12/1996 |
| EP | 0 749 021 A2 | 12/1996 |
| EP | 0 603 697 B1 | 9/1997 |
| EP | 0 797 111 A3 | 9/1997 |
| EP | 0 797 111 A2 | 9/1997 |
| EP | 0 492 545 B1 | 3/1998 |
| EP | 0 841 581 A1 | 5/1998 |
| EP | 0 844 265 A1 | 5/1998 |
| EP | 0 692 463 B1 | 4/1999 |
| EP | 0 745 568 B1 | 7/1999 |
| EP | 0 545 201 B1 | 10/1999 |
| EP | 0 564 134 B1 | 12/1999 |
| EP | 1 000 124 | 5/2000 |
| EP | 0 687 533 B1 | 9/2000 |
| EP | 1 051 448 | 11/2000 |
| EP | 0 738 771 B1 | 7/2001 |
| EP | 1 255 129 A2 | 11/2002 |
| EP | 0 749 021 B1 | 3/2003 |
| EP | 0 797 111 B1 | 10/2003 |
| GB | 2 306 126 A | 4/1997 |
| JP | 3-266801 | 11/1971 |
| JP | 58-046301 A | 3/1983 |
| JP | 58-126502 | 7/1983 |
| JP | 58-172244 | 10/1983 |
| JP | 58-213653 | 12/1983 |
| JP | 58-216195 A | 12/1983 |
| JP | 59-020401 A | 2/1984 |
| JP | 59-026944 | 2/1984 |
| JP | 59-049501 A | 3/1984 |
| JP | 59-115840 | 7/1984 |
| JP | 61-018901 | 1/1986 |
| JP | 61-040845 | 2/1986 |
| JP | 61-247743 | 11/1986 |
| JP | 63-021601 | 1/1988 |
| JP | 63-228101 | 9/1988 |
| JP | 63-296002 | 12/1988 |
| JP | 64-86101 | 3/1989 |
| JP | 1-294709 | 11/1989 |
| JP | 02-003472 A | 1/1990 |
| JP | 2-019801 | 1/1990 |
| JP | 2-116543 | 5/1990 |
| JP | 4-213384 | 8/1992 |
| JP | 4-342592 | 11/1992 |
| JP | 04-342592 A | 11/1992 |
| JP | 05-140509 A | 6/1993 |
| JP | 5-196802 | 8/1993 |
| JP | 5-254073 | 10/1993 |
| JP | 5-339007 | 12/1993 |
| JP | 5-341103 | 12/1993 |
| JP | 6-011602 | 1/1994 |
| JP | 6-025599 | 2/1994 |
| JP | 6-082603 | 3/1994 |
| JP | 6-082605 | 3/1994 |
| JP | 6-103928 | 4/1994 |
| JP | 6-279061 | 10/1994 |
| JP | 6-324214 | 11/1994 |
| JP | 7-081978 | 3/1995 |
| JP | 7-173412 | 7/1995 |
| JP | 7-287101 | 10/1995 |
| JP | 7-300346 | 11/1995 |
| JP | 7-315882 | 12/1995 |
| JP | 0 692 463 A1 | 1/1996 |
| JP | 09-13017 | 1/1997 |
| JP | 9-127307 | 5/1997 |
| JP | 9-133802 | 5/1997 |
| JP | HEI 9-255919 | 9/1997 |
| JP | 9-326240 | 12/1997 |
| JP | 10-026701 | 1/1998 |
| JP | HEI 10-143087 | 5/1998 |
| WO | WO 95/23804 A1 | 9/1995 |
| WO | WO 96/11289 A1 | 4/1996 |
| WO | WO 96/31343 A1 | 10/1996 |
| WO | WO 97/07155 A1 | 2/1997 |
| WO | WO 99/06490 A1 | 2/1999 |
| WO | WO 99/37720 A1 | 7/1999 |
| WO | WO 99/38034 A1 | 7/1999 |

OTHER PUBLICATIONS

"Mechanical Properties of Sputtered Films," brochure of Cerac Coating Materials News, CERAC, Inc., Milwaukee, WI, 3 pages, vol. 2, Issue 3, (Jul.–Sep. 1992).

W. J. Smith, *Modern Optical Engineering: The Design of Optical Systems*, $2^{nd}$ Ed.; McGraw–Hill, Inc., New York; Title page, Publication page, Table of Contents, and pp. 125–128 (10 pgs) (1990).

I.M. Thomas et al., "A novel perfluorinated AR and protective coating for KDP and other optical materials," *Proc. SPIE—Int. Soc. Opt. Eng.,* SPIE vol. 1441, Title page, Publication page, Table of Contents, and pp. 294–303 (16 pgs) (1991).

A. Ulman, "Monolayers of Organosilicon Derivatives," Chapter 3.2, in Part Three: Self–Assembled Monolayers, *An Introduction to Ultrathin Organic Films: from Langmuir-Blodgett to Self–Assembly,* Academic Press; Boston; Title page, Publication page, Table of Contents, and pp. 245–253 (16 pgs) (1991).

S. R. Wasserman et al., "Structure and Reactivity of Alkylsiloxane Monolayers Formed by Reaction of Alkyltrichlorosilanes on Silicon Substrates," *Langmuir,* 5, 1074–1087 (1989).

"Viratec—Clarifying Your Point–of–View with Thin Film Coatings," Product Information Brochure from Viratec Thin Films, Inc., Fairbault, MN, 8 pgs, (no date indicated).

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 14 and 15 is confirmed.

Claims 1, 10, 11, 13, 17, 26–34 and 40–43 are cancelled.

Claims 2–9, 12, 16 and 35–39 are determined to be patentable as amended.

Claims 18–25, dependent on an amended claim, are determined to be patentable.

New claim 44 is added and determined to be patentable.

2. The [antireflective article] *method* of claim [1] *16* wherein the antireflective surface comprises a metal oxide film having one or more metal oxides.

3. The [antireflective article] *method* of claim 2 wherein the antireflective surface comprises a vacuum deposited metal oxide film.

4. The [antireflective article] *method* of claim 3 wherein the antisoiling coating is at least about 15 Angstroms thick.

5. The [antireflective article] *method* of claim 4 wherein the antisoiling coating is no greater than about 150 Angstroms thick.

6. The [antireflective article] *method* of claim [1 which] *16 wherein the surface with the antisoiling coating* has a first surface antireflectivity that is different by less than about 0.5 percentage units from that of the same [article] *surface* without the antisoiling coating.

7. The [antireflective article] *method* of claim [1 wherein the coating is prepared by applying a coating composition comprising at least one fluorinated silane] *16* wherein each Y is a $C_1$–$C_4$ alkoxy group.

8. The [antireflective article] *method* of claim [1 wherein the coating is prepared by applying a coating composition comprising at least one fluorinated silane] *16* wherein $R_f$ is a perfluoropolyether group.

9. The [antireflective article] *method* of claim 8 [wherein the coating is prepared by applying a coating composition comprising at least one fluorinated silane] wherein $R_f$ is a perfluoropolyether group comprising perfluorinated repeating units selected from the group consisting of —($C_nF_{2n}$)—, —($C_nF_{2n}$O)—, —(CF(Z))—, —(CF(Z)O)—, —(CF(Z)$C_nF_{2n}$O)—, —($C_nF_{2n}$CF(Z)O)—, —(CF$_2$CF(Z)O)—, and combinations thereof, wherein n is 1 to 4 and Z is a perfluoroalkyl group, a perfluoroetheralkyl group, a perfluoroalkoxy group, or a perfluoroetheralkoxy group, each of which has about 1 to about 9 carbon atoms and 0 to about 4 oxygen atoms.

12. The [antireflective article] *method* of claim [1] *16* wherein $R^1$ includes about 2 to about 16 carbon atoms.

16. A method of applying an antisoiling coating to a substrate having an antireflective surface, the method comprising treating the antireflective surface with a coating composition comprising *an alkyl perfluoroalkyl ether and* at least one fluorinated silane having a number average molecular weight of at least about 1000 and the following formula:

wherein: $R_f$ is monovalent or divalent polyfluoropolyether group; $R^1$ is a substituted divalent alkylene group, arylene group, or combinations thereof, wherein at least one substituent in $R^1$ is selected from the group consisting of heteroatoms and functional groups, and further wherein at least one substituent in $R^1$ is optionally a halogen; $R^2$ is a $C_1$–$C_4$ alkyl group; Y is a halogen, a $C_1$–$C_4$ alkoxy group, or a $C_1$–$C_4$ acyloxy group; x is 0 or 1; and y is 1 or 2.

35. The [antireflective article] *method* of claim [34] *16* wherein $R^1$ is a divalent hydrocarbon containing at least one functional group.

36. The [antireflective article] *method* of claim [31] *16* wherein the [transparent] substrate *is transparent and* comprises a flexible organic polymeric material.

37. The [antireflective article] *method* of claim 36 further comprising an adhesion-enhancing coating disposed between the flexible organic polymeric substrate and the antireflective coating.

38. The [antireflective article] *method* of claim 37 wherein the antireflective coating comprises a metal oxide film having one or more metal oxides.

39. The [antireflective article] *method* of claim 38 wherein the antireflective surface comprises a vacuum deposited metal oxide film.

*44. A method of applying an antisoiling coating to a substrate having an antireflective surface, the method comprising:*

*coating the antireflective surface with a coating composition at room temperature, wherein the coating composition comprises a catalyst and at least one flourinated silane having a number average molecular weight of at least about 1000 and the following formula:*

*wherein: $R_f$ is a monovalent or divalent polyfluoropolyether group; $R^1$ is a substituted divalent alkylene group, arylene group, or combinations thereof, wherein at least one substituent in $R^1$ is selected from the group consisting of heteroatoms and functional groups, and further wherein at least one substituent in $R^1$ is optionally a halogen; $R^2$ is a $C_1$–$C_4$ alkyl group; Y is a halogen, a $C_1$–$C_4$ alkoxy group, or a $C_1$–$C_4$ acyloxy group; x is 0 or 1; and y is 1 or 2; and*

*exposing the coated composition of UV or electron beam radiation;*

*wherein the catalyst comprises an iodonium conpound, a sulfonium compound, or combination thereof.*

\* \* \* \* \*